United States Patent
Yang et al.

(10) Patent No.: US 11,812,314 B2
(45) Date of Patent: Nov. 7, 2023

(54) DYNAMIC SWITCHING BETWEEN CARRIER AGGREGATION AND MULTI-CONNECTIVITY

(71) Applicant: QUALCOMM Incorporated, San Diego, CA (US)

(72) Inventors: Ming Yang, San Diego, CA (US); Kausik Ray Chaudhuri, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 170 days.

(21) Appl. No.: 17/302,485

(22) Filed: May 4, 2021

(65) Prior Publication Data

US 2021/0368401 A1    Nov. 25, 2021

Related U.S. Application Data

(60) Provisional application No. 63/027,855, filed on May 20, 2020.

(51) Int. Cl.
| | |
|---|---|
| *H04W 36/00* | (2009.01) |
| *H04W 36/08* | (2009.01) |
| *H04W 76/19* | (2018.01) |
| *H04W 52/36* | (2009.01) |
| *H04L 1/1812* | (2023.01) |

(Continued)

(52) U.S. Cl.
CPC ....... *H04W 36/0069* (2018.08); *H04L 1/1819* (2013.01); *H04L 1/1896* (2013.01);
(Continued)

(58) Field of Classification Search
CPC . H04W 36/0069; H04W 24/10; H04W 36/08; H04W 52/365; H04W 76/19;
(Continued)

(56) References Cited

U.S. PATENT DOCUMENTS

| 10,321,335 B2 * | 6/2019 | Hwang | H04W 16/32 |
| 10,498,502 B2 * | 12/2019 | Mildh | H04L 5/001 |

(Continued)

FOREIGN PATENT DOCUMENTS

| EP | 2 945 440 A1 * | 11/2015 | H04W 52/34 |
| WO | WO-2020034568 A1 | 2/2020 | |

OTHER PUBLICATIONS

"3rd Generation Partnership Project, Technical Specification Group Radio Access Network, Evolved Universal Terrestrial Radio Access (E-UTRA), Radio Resource Control (RRC), Protocol specification (Release 16)", 3GPP Draft, Draft 36331-G00_V19, 3rd Generation Partnership Project (3GPP), Mobile Competence Centre, 650, Route Des Lucioles, F-06921 Sophia-Antipolis Cedex, France, Jan. 28, 2020 (Jan. 28, 2020), XP051845631, Retrieved from the Internet: URL: https://ftp.3gpp.org/Email_Discussions/RAN2/%5BRAN2%23108%5D/%5B108%2328%5D%5BR16%20RRC%5D%20RRC%20Merge/36331/Draft_36331-g00_v19.docx [retrieved on Jan. 28, 2020] paragraph [0388]—paragraph [0403].

(Continued)

*Primary Examiner* — Will W Lin
(74) *Attorney, Agent, or Firm* — Harrity & Harrity, LLP

(57) ABSTRACT

Various aspects of the present disclosure generally relate to wireless communication. In some aspects, a user equipment (UE) may transmit a first communication that includes information to facilitate selection and/or switching of carrier aggregation or multi-connectivity for a first cell group and a second cell group. The UE may receive, based at least in part on transmitting the first communication, a second communication that configures and/or switches carrier aggregation or multi-connectivity for the first cell group and the second cell group. Numerous other aspects are provided.

39 Claims, 10 Drawing Sheets

(51) Int. Cl.
*H04L 1/1867* (2023.01)
*H04W 24/10* (2009.01)

(52) U.S. Cl.
CPC .......... *H04W 24/10* (2013.01); *H04W 36/08* (2013.01); *H04W 52/365* (2013.01); *H04W 76/19* (2018.02)

(58) Field of Classification Search
CPC .... H04W 76/15; H04L 1/1819; H04L 1/1896; H04L 1/1825; H04L 1/0017; H04L 1/0026; H04L 5/001; H04L 5/0098; H04B 7/0413
See application file for complete search history.

(56) References Cited

U.S. PATENT DOCUMENTS

| | | | |
|---|---|---|---|
| 11,057,160 B2 * | 7/2021 | Lee | H04L 1/1628 |
| 2014/0192775 A1 | 7/2014 | Li et al. | |
| 2017/0041865 A1 | 2/2017 | Takeda et al. | |
| 2018/0279216 A1 | 9/2018 | Reial et al. | |
| 2019/0253985 A1 | 8/2019 | Dinan | |
| 2019/0342890 A1 * | 11/2019 | Tong | H04W 72/0453 |
| 2020/0045581 A1 * | 2/2020 | Dong | H04W 28/065 |
| 2020/0031483 A1 * | 10/2020 | Xu | H04W 72/0413 |
| 2020/0314836 A1 * | 10/2020 | Xu | H04W 72/52 |
| 2021/0266134 A1 * | 8/2021 | Axmon | H04W 56/001 |
| 2022/0303975 A1 * | 9/2022 | Ma | H04W 72/0453 |
| 2022/0418020 A1 * | 12/2022 | Adjakple | H04W 72/1215 |

OTHER PUBLICATIONS

International Search Report and Written Opinion—PCT/US2021/070511—ISA/EPO—dated Nov. 23, 2021.
Partial International Search Report—PCT/US2021/070511—ISA/EPO—dated Aug. 16, 2021.

* cited by examiner

DYNAMIC SWITCHING BETWEEN CARRIER AGGREGATION AND MULTI-CONNECTIVITY

CROSS-REFERENCE TO RELATED APPLICATION

This patent application claims priority to U.S. Provisional Patent Application No. 63/027,855, filed on May 20, 2020, entitled "DYNAMIC SWITCHING BETWEEN CARRIER AGGREGATION AND MULTI-CONNECTIVITY," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for dynamic switching between carrier aggregation and multi-connectivity.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include transmitting a first communication that includes information to facilitate selection of carrier aggregation or multi-connectivity for a first cell group and a second cell group; and receiving, based at least in part on transmitting the first communication, a second communication that configures carrier aggregation or multi-connectivity for the first cell group and the second cell group.

In some aspects, a method of wireless communication, performed by a UE, may include transmitting a first communication that includes information to facilitate switching between carrier aggregation and multi-connectivity for a first cell group and a second cell group; and receiving, based at least in part on transmitting the first communication, a second communication that configures a switch between carrier aggregation and multi-connectivity for the first cell group and the second cell group.

In some aspects, a method of wireless communication, performed by a base station, may include receiving, from a UE, a first communication including an indication to configure carrier aggregation or multi-connectivity for a first cell group and a second cell group; and transmitting, to the UE, a second communication that configures carrier aggregation or multi-connectivity for the first cell group and the second cell group based at least in part on at least one of the first communication, or one or more other parameters associated with at least one of the UE, the first cell group, or the second cell group.

In some aspects, a method of wireless communication, performed by a base station, may include receiving, from a UE, a first communication including an indication to switch between carrier aggregation and multi-connectivity for a first cell group and a second cell group; and transmitting, to the UE, a second communication that switches between carrier aggregation and multi-connectivity for the first cell group and the second cell group based at least in part on at least one of the first communication, or one or more other parameters associated with at least one of the UE, the first cell group, or the second cell group.

In some aspects, a UE for wireless communication may include a memory and one or more processors coupled to the memory. The memory and the one or more processors may be configured to transmit a first communication that includes information to facilitate selection of carrier aggregation or multi-connectivity for a first cell group and a second cell group; and receive, based at least in part on transmitting the first communication, a second communication that configures carrier aggregation or multi-connectivity for the first cell group and the second cell group.

In some aspects, a UE for wireless communication may include a memory and one or more processors coupled to the memory. The memory and the one or more processors may be configured to transmit a first communication that includes information to facilitate switching between carrier aggregation and multi-connectivity for a first cell group and a second cell group; and receive, based at least in part on transmitting the first communication, a second communication that configures a switch between carrier aggregation and multi-connectivity for the first cell group and the second cell group.

In some aspects, a base station for wireless communication may include a memory and one or more processors coupled to the memory. The memory and the one or more processors may be configured to receive, from a UE, a first communication including an indication to configure carrier aggregation or multi-connectivity for a first cell group and a second cell group; and transmit, to the UE, a second communication that configures carrier aggregation or multi-connectivity for the first cell group and the second cell group based at least in part on at least one of the first communication, or one or more other parameters associated with at least one of the UE, the first cell group, or the second cell group.

In some aspects, a base station for wireless communication may include a memory and one or more processors coupled to the memory. The memory and the one or more processors may be configured to receive, from a UE, a first communication including an indication to switch between carrier aggregation and multi-connectivity for a first cell group and a second cell group; and transmit, to the UE, a second communication that switches between carrier aggregation and multi-connectivity for the first cell group and the second cell group based at least in part on at least one of the first communication, or one or more other parameters associated with at least one of the UE, the first cell group, or the second cell group.

In some aspects, a non-transitory computer-readable medium may store one or more instructions for wireless communication. The one or more instructions, when executed by one or more processors of a UE, may cause the one or more processors to transmit a first communication that includes information to facilitate selection of carrier aggregation or multi-connectivity for a first cell group and a second cell group; and receive, based at least in part on transmitting the first communication, a second communication that configures carrier aggregation or multi-connectivity for the first cell group and the second cell group.

In some aspects, a non-transitory computer-readable medium may store one or more instructions for wireless communication. The one or more instructions, when executed by one or more processors of a UE, may cause the one or more processors to transmit a first communication that includes information to facilitate switching between carrier aggregation and multi-connectivity for a first cell group and a second cell group; and receive, based at least in part on transmitting the first communication, a second communication that configures a switch between carrier aggregation and multi-connectivity for the first cell group and the second cell group.

In some aspects, a non-transitory computer-readable medium may store one or more instructions for wireless communication. The one or more instructions, when executed by one or more processors of a BS, may cause the one or more processors to receive, from a UE, a first communication including an indication to configure carrier aggregation or multi-connectivity for a first cell group and a second cell group; and transmit, to the UE, a second communication that configures carrier aggregation or multi-connectivity for the first cell group and the second cell group based at least in part on at least one of the first communication, or one or more other parameters associated with at least one of the UE, the first cell group, or the second cell group.

In some aspects, a non-transitory computer-readable medium may store one or more instructions for wireless communication. The one or more instructions, when executed by one or more processors of a BS, may cause the one or more processors to receive, from a UE, a first communication including an indication to switch between carrier aggregation and multi-connectivity for a first cell group and a second cell group; and transmit, to the UE, a second communication that switches between carrier aggregation and multi-connectivity for the first cell group and the second cell group based at least in part on at least one of the first communication, or one or more other parameters associated with at least one of the UE, the first cell group, or the second cell group.

In some aspects, an apparatus for wireless communication may include means for transmitting a first communication that includes information to facilitate selection of carrier aggregation or multi-connectivity for a first cell group and a second cell group; and means for receiving, based at least in part on transmitting the first communication, a second communication that configures carrier aggregation or multi-connectivity for the first cell group and the second cell group.

In some aspects, an apparatus for wireless communication may include means for transmitting a first communication that includes information to facilitate switching between carrier aggregation and multi-connectivity for a first cell group and a second cell group; and means for receiving, based at least in part on transmitting the first communication, a second communication that configures a switch between carrier aggregation and multi-connectivity for the first cell group and the second cell group.

In some aspects, an apparatus for wireless communication may include means for receiving, from a UE, a first communication including an indication to configure carrier aggregation or multi-connectivity for a first cell group and a second cell group; and means for transmitting, to the UE, a second communication that configures carrier aggregation or multi-connectivity for the first cell group and the second cell group based at least in part on at least one of the first communication, or one or more other parameters associated with at least one of the UE, the first cell group, or the second cell group.

In some aspects, an apparatus for wireless communication may include means for receiving, from a UE, a first communication including an indication to switch between carrier aggregation and multi-connectivity for a first cell group and a second cell group; and means for transmitting, to the UE, a second communication that switches between carrier aggregation and multi-connectivity for the first cell group and the second cell group based at least in part on at least one of the first communication, or one or more other parameters associated with at least one of the UE, the first cell group, or the second cell group.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
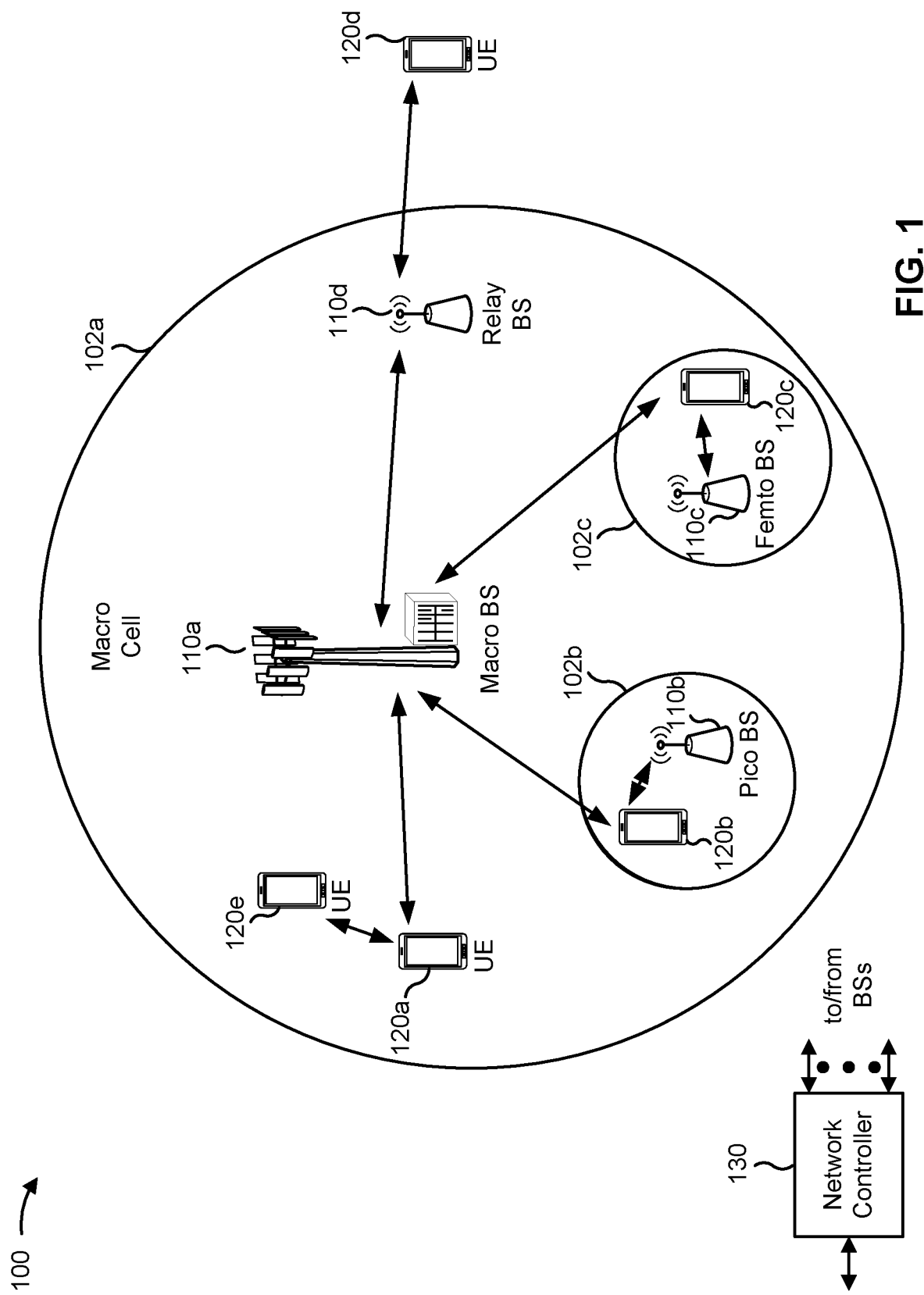
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
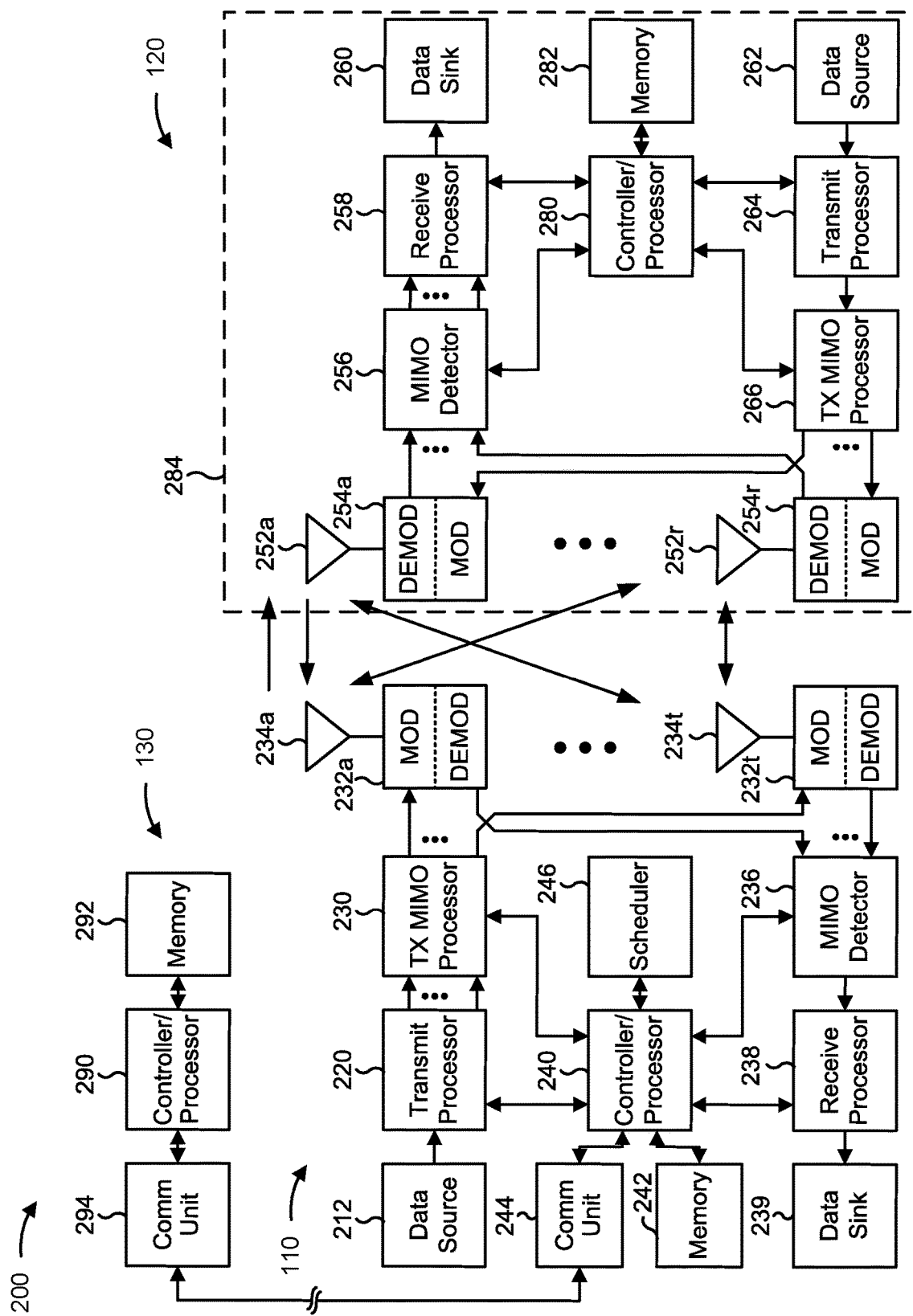
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-10).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-10).

Controller/processor 240 of base station 110, controller/processor 280 of UE 120, and/or any other component(s) of FIG. 2 may perform one or more techniques associated with dynamic switching between carrier aggregation and multi-connectivity, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, process 900 of FIG. 9, Process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, process 900 of FIG. 9, Process 1000 of FIG. 10, and/or other processes as described herein. In some aspects, executing instructions may include running the instructions, converting the instructions, compiling the instructions, and/or interpreting the instructions, among other examples.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

In some aspects, UE 120 may include means for transmitting a first communication that includes information to facilitate selection of carrier aggregation or multi-connectivity for a first cell group and a second cell group, means for receiving, based at least in part on transmitting the first communication, a second communication that configures carrier aggregation or multi-connectivity for the first cell group and the second cell group, and/or the like. In some aspects, UE 120 may include means for transmitting a first communication that includes information to facilitate switching between carrier aggregation and multi-connectivity for a first cell group and a second cell group, means for receiving, based at least in part on transmitting the first communication, a second communication that configures a switch between carrier aggregation and multi-connectivity for the first cell group and the second cell group, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, BS 110 may include means for receiving, from a UE 120, a first communication including an indication to configure carrier aggregation or multi-connectivity for a first cell group and a second cell group, means for transmitting, to the UE 120, a second communication that configures carrier aggregation or multi-connectivity for the first cell group and the second cell group based at least in part on at least one of the first communication or one or more other parameters associated with at least one of the UE 120, the first cell group, or the second cell group, and/or the like. In some aspects, BS 110 may include means for receiving, from a UE 120, a first communication including an indication to switch between carrier aggregation and multi-connectivity for a first cell group and a second cell group, means for transmitting, to the UE 120, a second communication that switches between carrier aggregation and multi-connectivity for the first cell group and the second cell group based at least in part on at least one of the first communication or one or more other parameters associated with at least one of the UE 120, the first cell group, or the second cell group, and/or the like. In some aspects, such means may include one or more components of BS 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figures 3A, 3B:
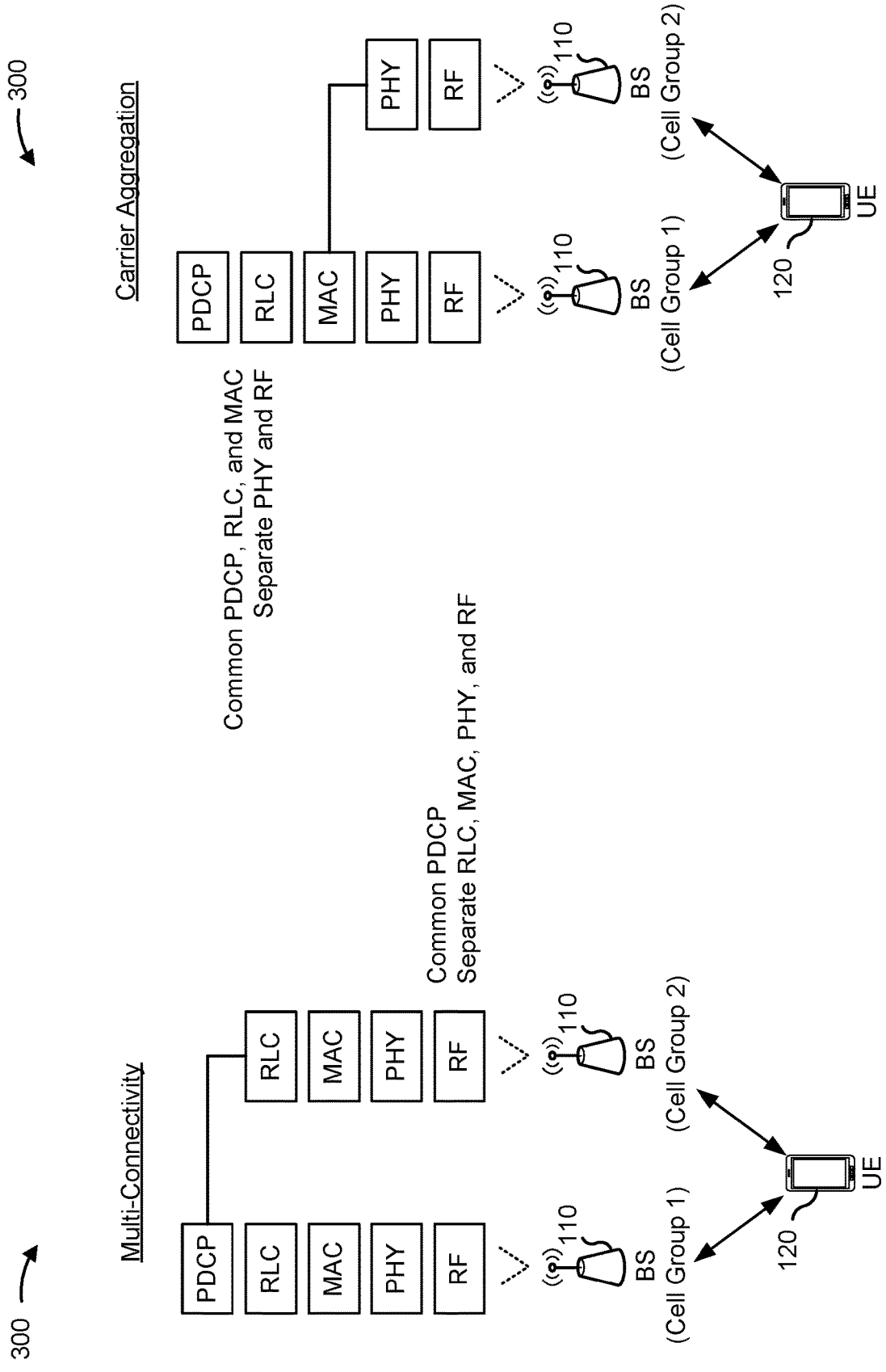
FIGS. 3A and 3B are diagrams illustrating examples of multi-connectivity and carrier aggregation, in accordance with the present disclosure.

FIGS. 3A and 3B are diagrams illustrating examples of multi-connectivity and carrier aggregation, in accordance with the present disclosure. As shown in FIGS. 3A and 3B, carrier aggregation and multi-connectivity may be used in communication configurations including two or more cells or cell groups configured for a UE 120. Carrier aggregation and multi-connectivity are techniques that may be used to aggregate component carriers (CCs) across a plurality of cells and frequency ranges (e.g., 3GPP Frequency Range 1 (FR1) or sub-6 Gigahertz (GHz), 3GPP Frequency Range 2 (FR2) or millimeter wave (mmW), and/or other frequency ranges) for the UE 120. The capability to aggregate CCs across a plurality of cells and frequency ranges may provide the UE 120 with increased bandwidth, decreased latency, increased reliability, and/or the like.

FIG. 3A illustrates an example 300 of multi-connectivity. As shown in FIG. 3A, "multi-connectivity configuration" may refer to a multi-cell deployment configuration in which a common packet data convergence protocol (PDCP) layer is shared across two or more cells or cell groups (e.g., cell group 1 implemented by one or more BSs 110, cell group 2 implemented by one or more BSs 110, and so on), and the radio link control (RLC) layers, the medium access control (MAC) layers, the physical (PHY) layers, and the radio frequency (RF) layers are maintained and operated separately for each of the cells or cell groups. The cell groups may operate on different frequency bands, on the same frequency bands, or combinations thereof. For example, cell group 1 may operate on an FR1 frequency band and cell group 2 may operate on an FR2 frequency band.

The separate and independent RLC layers of multi-connectivity may impose less of a throughput burden on the backhaul between cell group 1 and cell group 2 relative to carrier aggregation. Moreover, the separate and independent MAC layers of multi-connectivity may result in lower MAC layer complexity relative to carrier aggregation in scenarios where different subcarrier spacings are used between cell group 1 and cell group 2. However, due to separate and independent MAC layers, hybrid automatic repeat request (HARQ) feedback and channel state information (CSI) reporting is separately handled for cell group 1 and cell group 2, which may result in reduced FR2 coverage relative to carrier aggregation.

FIG. 3B illustrates and example 300 of carrier aggregation. As shown in FIG. 3B, "carrier aggregation configuration" may refer to a multi-cell deployment configuration in which a common PDCP layer, a common RLC layer, and a common MAC layer are shared across two or more cells or cell groups (e.g., cell group 1 and cell group 2), and the PHY layers and RF layers are maintained and operated separately for each of the cells or cell groups.

In a carrier aggregation configuration, RLC, HARQ feedback, and CSI reporting are handled on cell group 1, which allows for increased FR2 coverage in cell group 2 relative to multi-connectivity. Moreover, the common RLC layer and the common MAC layer results in lower latency and faster link adaptation relative to separate and independent RLC layers and MAC layers in multi-connectivity. However, the common RLC layer is handled by a single scheduler for cell group 1 and cell group 2, which imposes a higher backhaul burden on the backhaul between cell group 1 and cell group 2 (e.g., more information is shared across the backhaul relative to multi-connectivity). Moreover, because cell group 1 handles HARQ feedback for both cell group 1 and call group 2 with the common MAC layer, HARQ complexity may be increased relative to multi-connectivity in scenarios where cell group 1 and cell group 2 operate on different subcarrier spacings.

As indicated above, FIGS. 3A and 3B are provided as one or more examples. Other examples may differ from what is described with regard to FIGS. 3A and 3B.

Figure 4A:
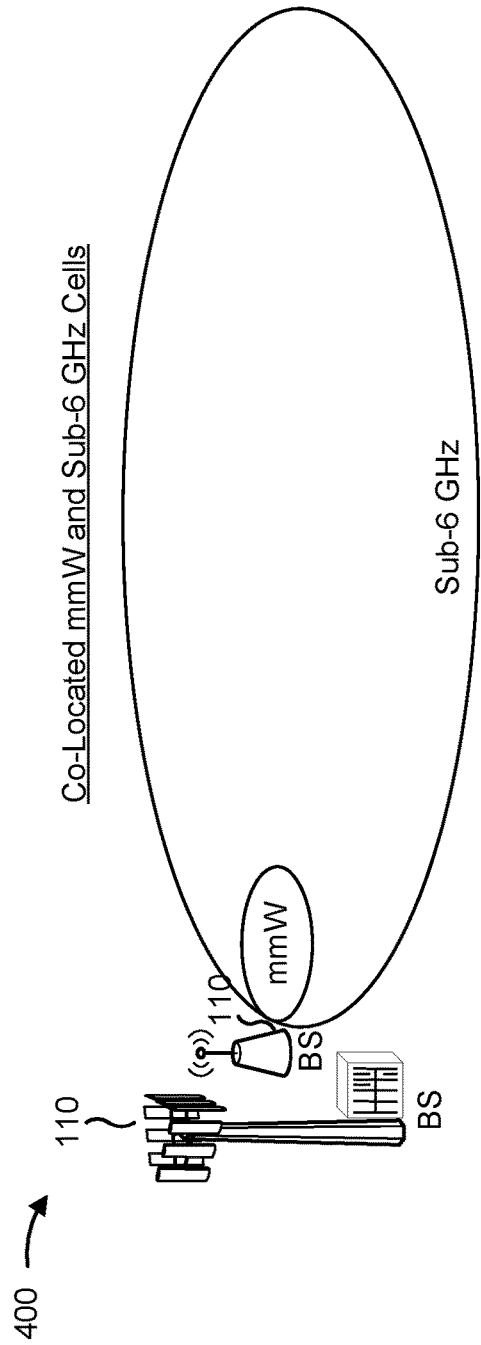
FIGS. 4A and 4B are diagrams illustrating examples of cell deployments, in accordance with the present disclosure.
Figure 4B:
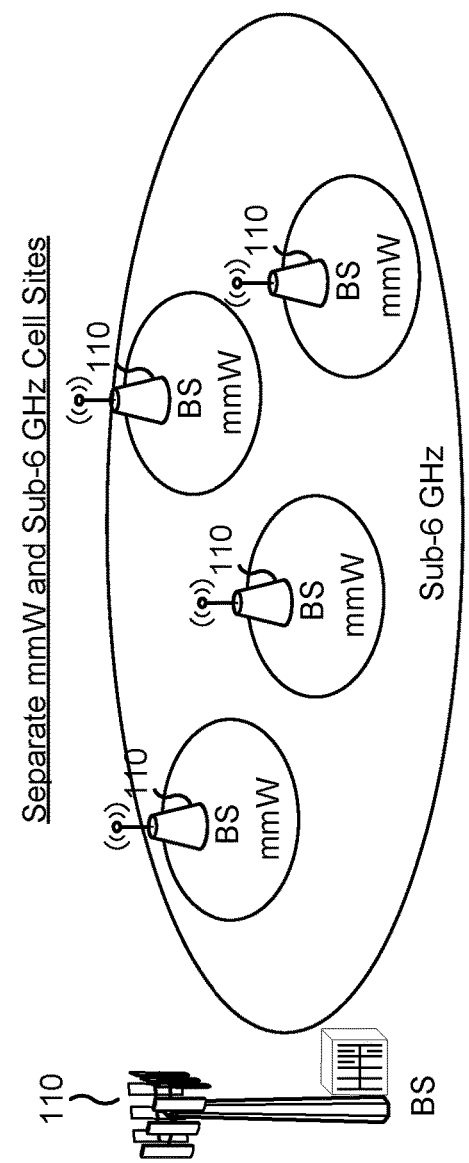

FIGS. 4A and 4B are diagrams illustrating examples 400 of cell deployments, in accordance with the present disclosure. As shown in FIGS. 4A and 4B, one or more BSs 110 may provide a plurality of cells in various cell deployment configurations. A cell may support a particular operating frequency band, such as an FR1 frequency band (e.g., a sub-6 GHz frequency band), and FR2 frequency band (e.g., an mmW frequency band), or another frequency band.

FIG. 4A illustrates an example 400 in which cell sites for a sub-6 GHz cell and an mmW cell (e.g., the locations of the BSs 110 providing the cells) are co-located. In these cases, the BSs 110 may be positioned near each other, may be the same BS 110, may be mounted on the same structure, and/or other like. In some scenarios, the example 400 illustrated in FIG. 4A may be an example cell deployment that can be used for initial deployment of 5G NR along with LTE (e.g., in non-standalone mode (NSA), in standalone mode (SA), and/or the like).

FIG. 4B illustrates an example 400 in which cell sites for a sub-6 GHz cell and an mmW cell are separate and dispersed. In these cases, mmW cell sites may be located within a sub-6 GHz cell, outside of a sub-6 GHz cell, at least partially in a sub-6 GHz cell, or a combination thereof. In some cases, the positioning of mmW cell sites may be determined based on research and testing after an initial co-location deployment of cell sites.

In some cases, a deployment of cell sites may include a combination of the example cell deployments illustrated in FIGS. 4A and 4B, as well as other example cell deployments. In some cases, the example cell deployments illustrated in FIGS. 4A and 4B, as well as other example cell deployments, may support carrier aggregation and/or multi-connectivity for a UE 120. In these cases, the BSs 110 illustrated in FIGS. 4A and 4B may be configured in one or more of the example arrangements illustrated and described above in connection with FIGS. 3A and 3B.

As indicated above, FIGS. 4A and 4B are provided as one or more examples. Other examples may differ from what is described with regard to FIGS. 4A and 4B.

As described above, a UE may be capable of supporting simultaneous connections with two or more cells or cell groups. In these cases, a BS may aggregate CCs across the cells or cell groups for the UE to increase bandwidth for the UE, decrease latency for the UE, increase reliability for the UE, and/or the like. However, a cell that operates on particular types of frequency bands, such as a mid to high time division duplexing (TDD) band or an mmW band, may suffer from uplink/downlink link imbalance in particular locations within the cell. "Uplink/downlink link imbalance" may refer to a scenario in which uplink coverage for a UE has degraded relative to downlink coverage or vice-versa. A UE may experience a decrease or loss in uplink coverage, for example, in a mmW cell the further from the cell site the UE is located.

As a result, the UE may be unable to provide HARQ feedback and/or CSI reports to the mmW cell if the UE is too far from the cell site without uplink support and the mmW cell is configured for multi-connectivity (e.g., in which HARQ feedback and CSI reporting is handled separately between cells and cell groups). Moreover, some UE implementations and communication scenarios may be better suited for carrier aggregation, while other UE implementations and communication scenarios may be better suited for multi-connectivity. Thus, without input from the UE, a BS may be unable to configure the appropriate and/or optimized CC aggregation technique for the UE, which may result in decreased throughput for the UE, increased latency for the UE, decreased reliability for the UE, and/or the like.

Some aspects described herein provide techniques and apparatuses for dynamic switching between carrier aggregation and multi-connectivity. In some aspects, a UE 120 may be capable of providing UE assistance information to a BS 110. The UE assistance information may include information to facilitate selection of carrier aggregation or multi-connectivity for a first cell group and a second cell group associated with the UE 120. The UE assistance information may be based at least in part on various parameters associated with the UE 120, such as UE implementation, operating parameters (e.g., transmit power of the UE, power consumption of the UE, uplink/downlink imbalance, and/or the like), and/or the like.

In this way, the BS 110 may receive the UE assistance information, and may configure or switch the first cell group and the second cell group to carrier aggregation or multi-connectivity based at least in part on the UE assistance information and/or other parameters. This permits the BS 110 to configure the appropriate and/or optimized CC aggregation technique for the UE 120, which may provide increased throughput for the UE 120, decreased latency for the UE 120, increased reliability for the UE 120, and/or the like.

Figure 5:
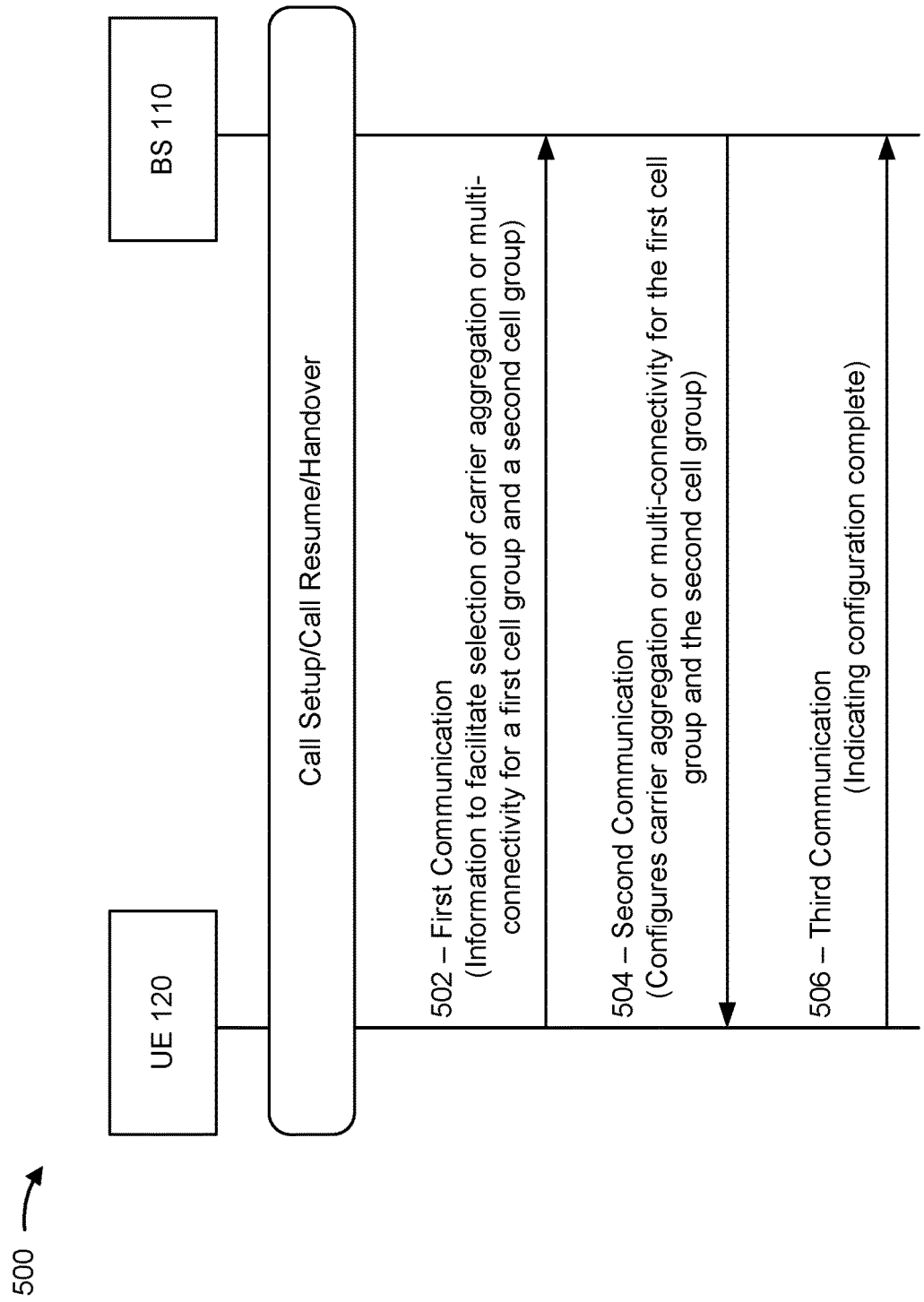
FIGS. 5 and 6 are diagrams illustrating examples of dynamic switching between carrier aggregation and multi-connectivity, in accordance with the present disclosure.

FIG. 5 is a diagram illustrating an example 500 of dynamic switching between carrier aggregation and multi-connectivity, in accordance with the present disclosure. As shown in FIG. 5, example 500 may include communication between a UE 120 and a BS 110. In some aspects, the UE 120 and the BS 110 may be included in a wireless network such as wireless network 100. In some aspects, the UE 120 and the BS 110 may communicate on a wireless access link, which may include an uplink and a downlink.

In some aspects, the BS 110 may provide one or more cells and/or one or more cell groups. In some aspects, another BS 110 may provide one or more other cells and/or one or more other cell groups. In some aspects, the UE 120 may be simultaneously communicatively connected with one or more first cells and/or one or more first cell groups (e.g., provided by the BS 110) and one or more second cells and/or one or more second cell groups (e.g., provided by the BS 110 or another BS 110). In these cases, the BS 110 may be capable of configuring, switching, and/or deactivating carrier aggregation (e.g., as illustrated in the example in FIG. 3A and/or the like) and/or multi-connectivity (e.g., as illustrated in the example in FIG. 3B and/or the like) across the one or more first cells and/or the one or more first cell groups, across the one or more second cells and/or the one or more second cell groups, and/or across the one or more first cell groups and the one or more second cell groups.

As shown in FIG. 5, and by reference number 502, the UE 120 may transmit a first communication to the BS 110. The UE 120 may transmit the first communication at various times and during (or in connection with) various communication procedures. For example, and as illustrated in FIG. 5, the UE 120 may transmit the first communication during (or in connection with) a call setup procedure (or radio resource control (RRC) setup procedure), a call resume procedure (or RRC resume procedure), a handover of the UE 120, and/or the like. The first communication may include various types of communications transmitted on the uplink, including an RRC setup request communication, an RRC resume request communication, a measurement report, a MAC control element (MAC-CE) communication, a CSI report, and/or the like.

The first communication may include UE assistance information, which may include information to facilitate selection of carrier aggregation or multi-connectivity for a first cell group and a second cell group. The information to facilitate selection of carrier aggregation or multi-connectivity for the first cell group and the second cell group may include an indication of a preference for carrier aggregation for the first cell group and the second cell group or an indication of a preference for multi-connectivity for the first cell group and the second cell group.

The preference for carrier aggregation or multi-connectivity may be based at least in part on various factors and/or parameters associated with the UE 120. For example, the preference for carrier aggregation or multi-connectivity may be based at least in part on a transmit power of the UE 120 (e.g., an uplink transmit power associated with the first cell group and/or the second cell group). As another example, the preference for carrier aggregation or multi-connectivity may be based at least in part on a power consumption of the UE 120 (e.g., an expected power consumption, an actual measured power consumption, and/or the like) in a carrier aggregation configuration and/or a power consumption of the UE 120 (e.g., an expected power consumption, an actual measured power consumption, and/or the like) in a multi-connectivity configuration. As another example, the preference for carrier aggregation or multi-connectivity may be based at least in part on one or more quality of service (QoS) parameters associated with application traffic for the UE 120.

In some aspects, the preference for carrier aggregation or multi-connectivity may be based at least in part on various parameters and/or factors associated with the first cell group and the second cell group. For example, the preference for carrier aggregation or multi-connectivity may be based at least in part on a difference in aggregated bandwidth between the first cell group and the second cell group, a difference in subcarrier spacing between the first cell group and the second cell group, a frequency band associated with the first cell group, a frequency band associated with the second cell group, an uplink/downlink link imbalance associated with the first cell group, an uplink/downlink link imbalance associated with the second cell group, a TDD band or a frequency division duplexing (FDD) band associated with the first cell group, a TDD band or an FDD band associated with the second cell group, a TDD pattern associated with the first cell group, a TDD pattern associated with the second cell group, a HARQ feedback mode associated with the first cell group, a HARQ feedback mode associated with the second cell group, a quantity of CCs in the first cell group, a quantity of CCs in the second cell group, an indication of which CCs are in the first cell group, an indication of which CCs are in the second cell group, and/or the like.

In some aspects, the preference for carrier aggregation or multi-connectivity may be based at least in part on a combination of the factors and/or parameters associated with the UE 120, the first cell group, and/or the second cell group described above and/or other factors and/or parameters.

In some aspects, the information to facilitate selection of carrier aggregation or multi-connectivity for the first cell group and the second cell group may include other types of information. For example, the information to facilitate selection of carrier aggregation or multi-connectivity for the first cell group and the second cell group may include various types of measurements and/or reports, such as a power headroom report (PHR), a CSI report, RSRP measurements, RSSI measurements, RSRQ measurements, CQI measurements, latency measurements, MAC-CE HARQ feedback, and/or the like. As another example, the information to facilitate selection of carrier aggregation or multi-connectivity for the first cell group and the second cell group may include an indication of a transport latency between the first cell group and the second cell group, a bandwidth between the first cell group and the second cell group, a frequency band associated with the first cell group, a frequency band associated with the second cell group, an uplink/downlink link imbalance associated with the first cell group, an uplink/downlink link imbalance associated with the second cell group, a TDD band or an FDD band associated with the first cell group, a TDD band or an FDD band associated with the second cell group, a TDD pattern associated with the first cell group, a TDD pattern associated with the second cell group, a HARQ feedback mode associated with the first cell group, a HARQ feedback mode associated with the second cell group, a quantity of CCs in the first cell group, a quantity of CCs in the second cell group, an indication of which CCs are in the first cell group, an indication of which CCs are in the second cell group, and/or the like.

As further shown in FIG. 5, and by reference number 504, the BS 110 may receive the first communication and may transmit, to the UE 120, a second communication based at least in part on receiving the first communication. The BS 110 may transmit the second communication at various times and during (or in connection with) various communication procedures. For example, and as illustrated in FIG. 5, the BS 110 may transmit the second communication during (or in connection with) a call setup procedure (or RRC setup procedure), a call resume procedure (or RRC resume procedure), a handover of the UE 120, and/or the like. The second communication may include various types of communications transmitted on the downlink, including an RRC setup command communication, an RRC resume command communication, an RRC reconfiguration communication, a handover command communication, a MAC-CE communication, a downlink control information (DCI) communication, and/or the like.

The second communication may configure carrier aggregation or multi-connectivity for the first cell group and the second cell group. For example, the second communication may include an indication that carrier aggregation or multi-connectivity for the first cell group and the second cell group, may include an instruction for the UE 120 to modify one or more operating parameters of the UE 120 for carrier aggregation or multi-connectivity (e.g., may indicate that HARQ feedback and/or CSI reports for the first cell group and the second cell group are to be transmitted to the first cell group or are to be transmitted to the respective cell groups, and/or the like), and/or the like. In some aspects, the second communication configures carrier aggregation with one or more timing advance groups (TAGs) and/or one or more physical uplink control channel (PUCCH) groups.

In some aspects, the BS 110 may select and configure carrier aggregation or multi-connectivity for the first cell group and the second cell group based at least in part on the first communication (e.g., the information to facilitate selection of carrier aggregation or multi-connectivity for the first cell group and the second cell group included in the first communication). In some aspects, the BS 110 may select and configure carrier aggregation or multi-connectivity for the first cell group and the second cell group based at least in part on one or more other parameters associated with the UE 120, the first cell group, and/or the second cell group. In some aspects, the BS 110 may select and configure carrier aggregation or multi-connectivity for the first cell group and the second cell group based at least in part on a combination of the first communication and the one or more other parameters.

The one or more other parameters may include, for example, one or more parameters associated with the UE 120, such as a signal to interference plus noise ratio (SINR) of a sounding reference signal (SRS) transmitted by the UE 120, an SINR of a demodulation reference signal (DMRS) transmitted by the UE 120, and/or the like. As another example, the one or more other parameters may be associated with the first cell group and the second cell group, and may include a traffic buffer size associated with the first cell group, a traffic buffer size associated with the second cell group, inter-site carrier aggregation associated with the first cell group and the second cell group, whether the first cell group and the second cell group are co-located (e.g., as illustrated above in FIGS. 4A and 4B), a transport latency and/or bandwidth between the first cell group and the second cell group on a backhaul between the first cell group and the second cell group, a bandwidth associated with the first cell group, a bandwidth associated with the second cell group, or radio access network splitting associated with the first cell group and the second cell group.

As further shown in FIG. 5, and by reference number 506, the UE 120 may receive the second communication and may transmit, to the BS 110, a third communication based at least in part on receiving the second communication. In some aspects, the third communication may indicate that configuration of carrier aggregation or multi-connectivity configuration has been implemented by the UE 120 and is complete. The third communication may include an RRC setup complete communication, an RRC reconfiguration complete communication, and/or the like. Accordingly, the UE 120 may communicate with the first cell group and/or the second cell group using a carrier aggregation communication configuration or using a multi-connectivity communication configuration.

In this way, the BS 110 may receive the UE assistance information, and may configure the first cell group and the second cell group for carrier aggregation or multi-connectivity based at least in part on the UE assistance information and/or other parameters. This permits the BS 110 to configure the appropriate and/or optimized CC aggregation technique for the UE 120, which may provide increased throughput for the UE 120, decreased latency for the UE 120, increased reliability for the UE 120, and/or the like.

As indicated above, FIG. 5 is provided as an example. Other examples may differ from what is described with regard to FIG. 5.

Figure 6:
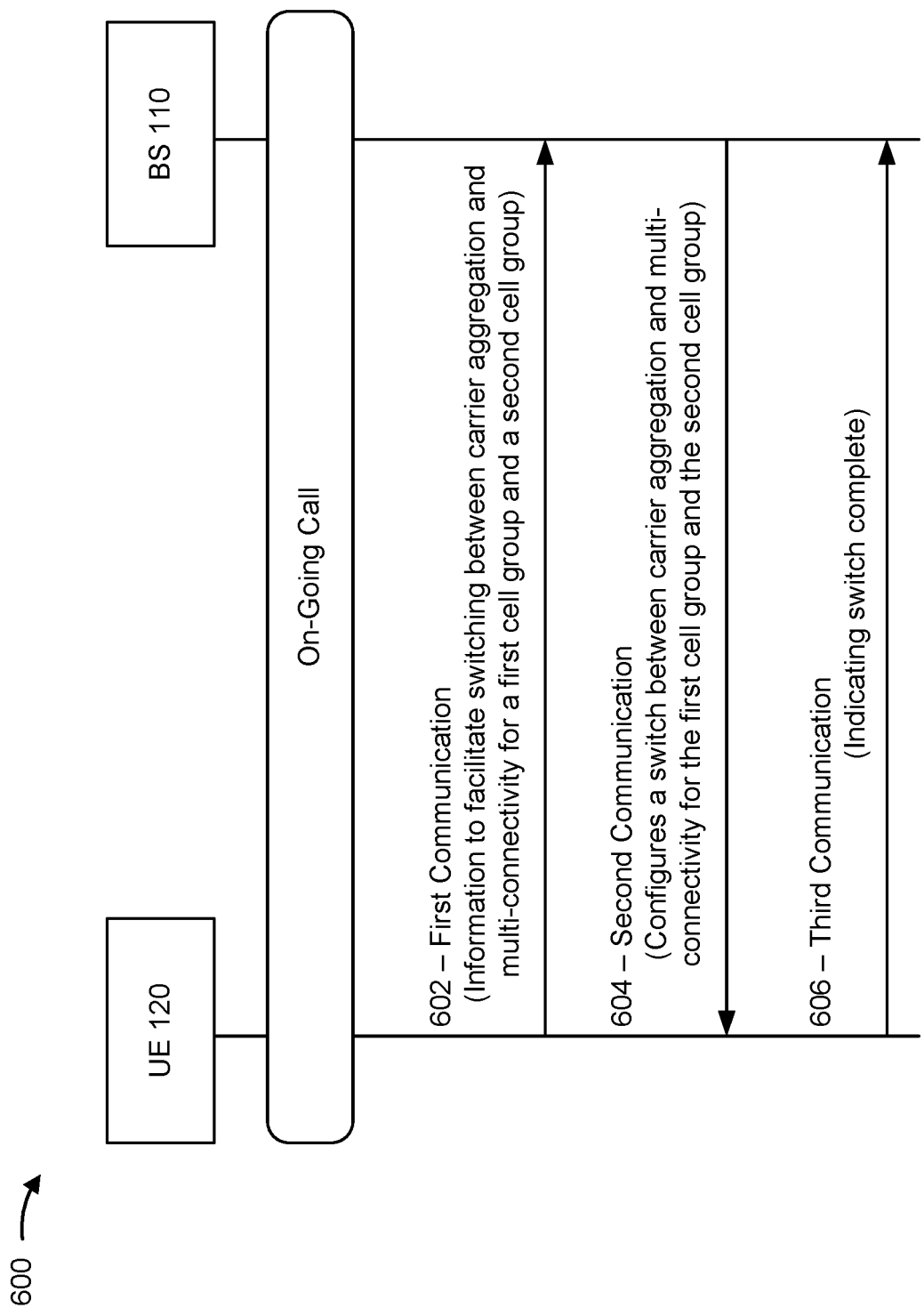

FIG. 6 is a diagram illustrating an example 600 of dynamic switching between carrier aggregation and multi-connectivity, in accordance with the present disclosure. As shown in FIG. 6, example 600 may include communication between a UE 120 and a BS 110. In some aspects, the UE 120 and the BS 110 may be included in a wireless network such as wireless network 100. In some aspects, the UE 120 and the BS 110 may communicate on a wireless access link, which may include an uplink and a downlink.

In some aspects, the BS 110 may provide one or more cells and/or one or more cell groups. In some aspects, another BS 110 may provide one or more other cells and/or one or more other cell groups. In some aspects, the UE 120 may be simultaneously communicatively connected with one or more first cells and/or one or more first cell groups (e.g., provided by the BS 110) and one or more second cells and/or one or more second cell groups (e.g., provided by the BS 110 or another BS 110). In these cases, the BS 110 may be capable of configuring, switching, and/or deactivating carrier aggregation (e.g., as illustrated in the example in FIG. 3A and/or the like) and/or multi-connectivity (e.g., as illustrated in the example in FIG. 3B and/or the like) across the one or more first cells and/or the one or more first cell groups, across the one or more second cells and/or the one or more second cell groups, and/or across the one or more first cell groups and the one or more second cell groups.

As shown in FIG. 6, and by reference number 602, the UE 120 may transmit a first communication to the BS 110. The UE 120 may transmit the first communication at various times and during (or in connection with) various communication procedures. For example, and as illustrated in FIG. 5, the UE 120 may transmit the first communication during (or in connection with) an on-going call, while being RRC connected and in an active state, and/or the like. The first communication may include various types of communications transmitted on the uplink, including a measurement report, a MAC-CE communication, a CSI report, and/or the like.

The first communication may include UE assistance information, which may include information to facilitate a switch between carrier aggregation and multi-connectivity for a first cell group and a second cell group. The information to facilitate a switch between carrier aggregation and multi-connectivity for the first cell group and the second cell group may include an indication of a preference for carrier aggregation for the first cell group and the second cell group or an indication of a preference for multi-connectivity for the first cell group and the second cell group.

The preference for carrier aggregation or multi-connectivity may be based at least in part on various factors and/or parameters associated with the UE 120. For example, the preference for carrier aggregation or multi-connectivity may be based at least in part on a transmit power of the UE 120 (e.g., an uplink transmit power associated with the first cell group and/or the second cell group). As another example, the preference for carrier aggregation or multi-connectivity may be based at least in part on a power consumption of the UE 120 (e.g., an expected power consumption, an actual measured power consumption, and/or the like) in a carrier aggregation configuration and/or a power consumption of the UE 120 (e.g., an expected power consumption, an actual measured power consumption, and/or the like) in a multi-connectivity configuration. As another example, the preference for carrier aggregation or multi-connectivity may be based at least in part on one or more QoS parameters associated with application traffic for the UE 120.

In some aspects, the preference for carrier aggregation or multi-connectivity may be based at least in part on various parameters and/or factors associated with the first cell group and the second cell group. For example, the preference for carrier aggregation or multi-connectivity may be based at least in part on a difference in aggregated bandwidth between the first cell group and the second cell group, a difference in subcarrier spacing between the first cell group and the second cell group, a frequency band associated with the first cell group, a frequency band associated with the second cell group, an uplink/downlink link imbalance associated with the first cell group, an uplink/downlink link imbalance associated with the second cell group, a TDD band or an FDD band associated with the first cell group, a TDD band or an FDD band associated with the second cell group, a TDD pattern associated with the first cell group, a TDD pattern associated with the second cell group, a HARQ feedback mode associated with the first cell group, a HARQ feedback mode associated with the second cell group, a quantity of CCs in the first cell group, a quantity of CCs in the second cell group, an indication of which CCs are in the first cell group, an indication of which CCs are in the second cell group, and/or the like.

In some aspects, the preference for carrier aggregation or multi-connectivity may be based at least in part on a combination of the factors and/or parameters associated with the UE 120, the first cell group, and/or the second cell group described above and/or other factors and/or parameters.

In some aspects, the information to facilitate a switch between carrier aggregation and multi-connectivity for the first cell group and the second cell group may include other types of information. For example, the information to facilitate a switch between carrier aggregation and multi-connectivity for the first cell group and the second cell group may include various types of measurements and/or reports, such as a PHR, a CSI report, RSRP measurements, RSSI measurements, RSRQ measurements, CQI measurements, latency measurements, MAC-CE HARQ feedback, and/or the like. As another example, the information to facilitate a switch between carrier aggregation and multi-connectivity for the first cell group and the second cell group may include an indication of a transport latency between the first cell group and the second cell group, a bandwidth between the first cell group and the second cell group, a frequency band associated with the first cell group, a frequency band associated with the second cell group, an uplink/downlink link imbalance associated with the first cell group, an uplink/downlink link imbalance associated with the second cell group, a TDD band or an FDD band associated with the first cell group, a TDD band or an FDD band associated with the second cell group, a TDD pattern associated with the first cell group, a TDD pattern associated with the second cell group, a HARQ feedback mode associated with the first cell group, a HARQ feedback mode associated with the second cell group, a quantity of CCs in the first cell group, a quantity of CCs in the second cell group, an indication of which CCs are in the first cell group, an indication of which CCs are in the second cell group, and/or the like.

As further shown in FIG. 6, and by reference number 604, the BS 110 may receive the first communication and may transmit, to the UE 120, a second communication based at least in part on receiving the first communication. The BS 110 may transmit the second communication at various times and during (or in connection with) various communication procedures. For example, and as illustrated in FIG. 5, the BS 110 may transmit the second communication during (or in connection with) an on-going call, while in an RRC connected state with the UE 120, and/or the like. The second communication may include various types of communications transmitted on the downlink, including an RRC reconfiguration communication, a handover command communication, a MAC-CE communication, a DCI communication, and/or the like.

The second communication may configure a switch between carrier aggregation and multi-connectivity for the first cell group and the second cell group. For example, the second communication may include an indication that the UE 120 is to switch between carrier aggregation and multi-connectivity for the first cell group and the second cell group, may include an instruction for the UE 120 to modify one or more operating parameters of the UE 120 for carrier aggregation or multi-connectivity (e.g., may indicate that HARQ feedback and/or CSI reports for the first cell group and the second cell group are to be transmitted to the first cell group or are to be transmitted to the respective cell groups, and/or the like), and/or the like. The indication that the UE 120 is to switch between carrier aggregation and multi-connectivity for the first cell group and the second cell group may include an indication to switch from carrier aggregation to multi-connectivity, or may include an indication to switch from multi-connectivity to carrier aggregation. In some aspects, the second communication configures carrier aggregation with one or more TAGs and/or one or more PUCCH groups.

In some aspects, the BS 110 may select and configure the switch between carrier aggregation and multi-connectivity for the first cell group and the second cell group based at least in part on the first communication (e.g., the information to facilitate a switch between carrier aggregation and multi-connectivity for the first cell group and the second cell group included in the first communication). In some aspects, the BS 110 may select and configure the switch between carrier aggregation and multi-connectivity for the first cell group and the second cell group based at least in part on one or more other parameters associated with the UE 120, the first cell group, and/or the second cell group. In some aspects, the BS 110 may switch between carrier aggregation and multi-connectivity for the first cell group and the second cell group based at least in part on a combination of the first communication and the one or more other parameters.

The one or more other parameters may include, for example, one or more parameters associated with the UE 120, such as an SINR of an SRS transmitted by the UE 120, an SINR of a DMRS transmitted by the UE 120, and/or the like. As another example, the one or more other parameters may be associated with the first cell group and the second cell group, and may include a traffic buffer size associated with the first cell group, a traffic buffer size associated with the second cell group, inter-site carrier aggregation associated with the first cell group and the second cell group, whether the first cell group and the second cell group are co-located (e.g., as illustrated above in FIGS. 4A and 4B), a transport latency and/or bandwidth between the first cell group and the second cell group on a backhaul between the first cell group and the second cell group, a bandwidth associated with the first cell group, a bandwidth associated with the second cell group, or radio access network splitting associated with the first cell group and the second cell group.

As further shown in FIG. 6, and by reference number 606, the UE 120 may receive the second communication and may transmit, to the BS 110, a third communication based at least in part on receiving the second communication. In some aspects, the third communication may indicate that the switch between carrier aggregation and multi-connectivity configuration has been implemented by the UE 120 and is complete. The third communication may include an RRC reconfiguration complete communication and/or the like. Accordingly, the UE 120 may communicate with the first cell group and/or the second cell group using a carrier aggregation communication configuration or using a multi-connectivity communication configuration.

In this way, the BS 110 may receive the UE assistance information, and may configure a switch between carrier aggregation or multi-connectivity for the first cell group and the second cell group based at least in part on the UE assistance information and/or other parameters. This permits the BS 110 to configure the appropriate and/or optimized CC aggregation technique for the UE 120, which may provide increased throughput for the UE 120, decreased latency for the UE 120, increased reliability for the UE 120, and/or the like.

As indicated above, FIG. 6 is provided as an example. Other examples may differ from what is described with regard to FIG. 6.

Figure 7:
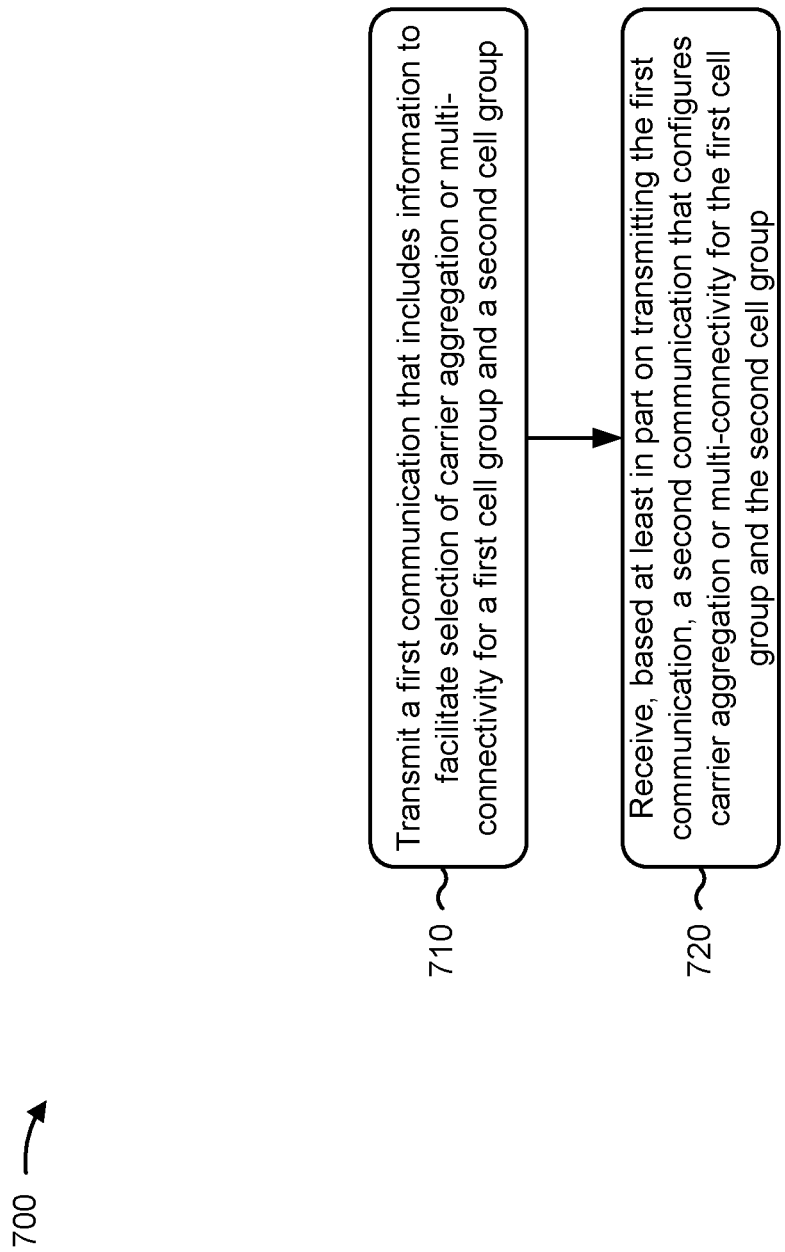
FIGS. 7-10 are diagrams illustrating example processes associated with dynamic switching between carrier aggregation and multi-connectivity, in accordance with the present disclosure.

FIG. 7 is a diagram illustrating an example process 700 performed, for example, by a UE, in accordance with the present disclosure. Example process 700 is an example where the UE (e.g., UE 120 and/or the like) performs operations associated with dynamic switching between carrier aggregation and multi-connectivity.

As shown in FIG. 7, in some aspects, process 700 may include transmitting a first communication that includes information to facilitate selection of carrier aggregation or multi-connectivity for a first cell group and a second cell group (block 710). For example, the UE (e.g., using receive processor 258, transmit processor 264, controller/processor 280, memory 282, and/or the like) may transmit a first communication that includes information to facilitate selection of carrier aggregation or multi-connectivity for a first cell group and a second cell group, as described above.

As further shown in FIG. 7, in some aspects, process 700 may include receiving, based at least in part on transmitting the first communication, a second communication that configures carrier aggregation or multi-connectivity for the first cell group and the second cell group (block 720). For example, the UE (e.g., using receive processor 258, transmit processor 264, controller/processor 280, memory 282, and/or the like) may receive, based at least in part on transmitting the first communication, a second communication that configures carrier aggregation or multi-connectivity for the first cell group and the second cell group, as described above.

Process 700 may include additional aspects, such as any single aspect or any combination of aspects described below and/or in connection with one or more other processes described elsewhere herein.

In a first aspect, the information to facilitate selection of carrier aggregation or multi-connectivity for the first cell group and the second cell group comprises: an indication of a preference for carrier aggregation, or an indication of a preference for multi-connectivity. In a second aspect, alone or in combination with the first aspect, the information to facilitate selection of carrier aggregation or multi-connectivity for the first cell group and the second cell group includes a PHR report, a transport latency between the first cell group and the second cell group, a bandwidth between the first cell group and the second cell group, a frequency band associated with the first cell group, a frequency band associated with the second cell group, an uplink/downlink link imbalance associated with the first cell group, an uplink/downlink link imbalance associated with the second cell group, a TDD band or an FDD band associated with the first cell group, a TDD band or an FDD band associated with the second cell group, a TDD pattern associated with the first cell group, a TDD pattern associated with the second cell group, a HARQ feedback mode associated with the first cell group, a HARQ feedback mode associated with the second cell group, a quantity of CCs in the first cell group, a quantity of CCs in the second cell group, an indication of which CCs are in the first cell group, an indication of which CCs are in the second cell group, a MAC-CE communication, a CSI report, or one or more signal measurements.

In a third aspect, alone or in combination with one or more of the first and second aspects, the information to facilitate selection of carrier aggregation or multi-connectivity for the first cell group and the second cell group is based at least in part on at least one of: a UE transmit power associated with the UE, a UE power consumption in carrier aggregation associated with the UE, a UE power consumption in multi-connectivity associated with the UE, a difference in aggregated bandwidth between the first cell group and the second cell group, a difference in subcarrier spacing between the first cell group and the second cell group, a frequency band associated with the first cell group, a frequency band associated with the second cell group, an uplink/downlink link imbalance associated with the first cell group, an uplink/downlink link imbalance associated with the second cell group, a TDD band or an FDD band associated with the first cell group, a TDD band or an FDD band associated with the second cell group, a TDD pattern associated with the first cell group, a TDD pattern associated with the second cell group, a HARQ feedback mode associated with the first cell group, a HARQ feedback mode associated with the second cell group, a quantity of CCs in the first cell group, a quantity of CCs in the second cell group, an indication of which CCs are in the first cell group, an indication of which CCs are in the second cell group, or a QoS parameter associated with application traffic.

In a fourth aspect, alone or in combination with one or more of the first through third aspects, transmitting the first communication includes transmitting the first communication during at least one of: a call setup, an RRC resume procedure, or a handover of the UE. In a fifth aspect, alone or in combination with one or more of the first through fourth aspects, the first communication includes an RRC setup request communication, an RRC resume request communication, a measurement report, a MAC-CE communication, or a CSI report.

In a sixth aspect, alone or in combination with one or more of the first through fifth aspects, the information to facilitate selection of carrier aggregation or multi-connectivity includes information to facilitate switching between carrier aggregation and multi-connectivity for the first cell group and the second cell group, and the second communication configures a switch between carrier aggregation and multi-connectivity for the first cell group and the second cell group. In a seventh implementation, alone or in combination with one or more of the first through sixth implementations, the second communication configures carrier aggregation with at least one of one or more TAGs or one or more PUCCH groups. In an eighth implementation, alone or in combination with one or more of the first through seventh implementations, process 700 includes transmitting, based at least in part on receiving the second communication, a third communication indicating that configuration of carrier aggregation or multi-connectivity configuration has been implemented by the UE.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
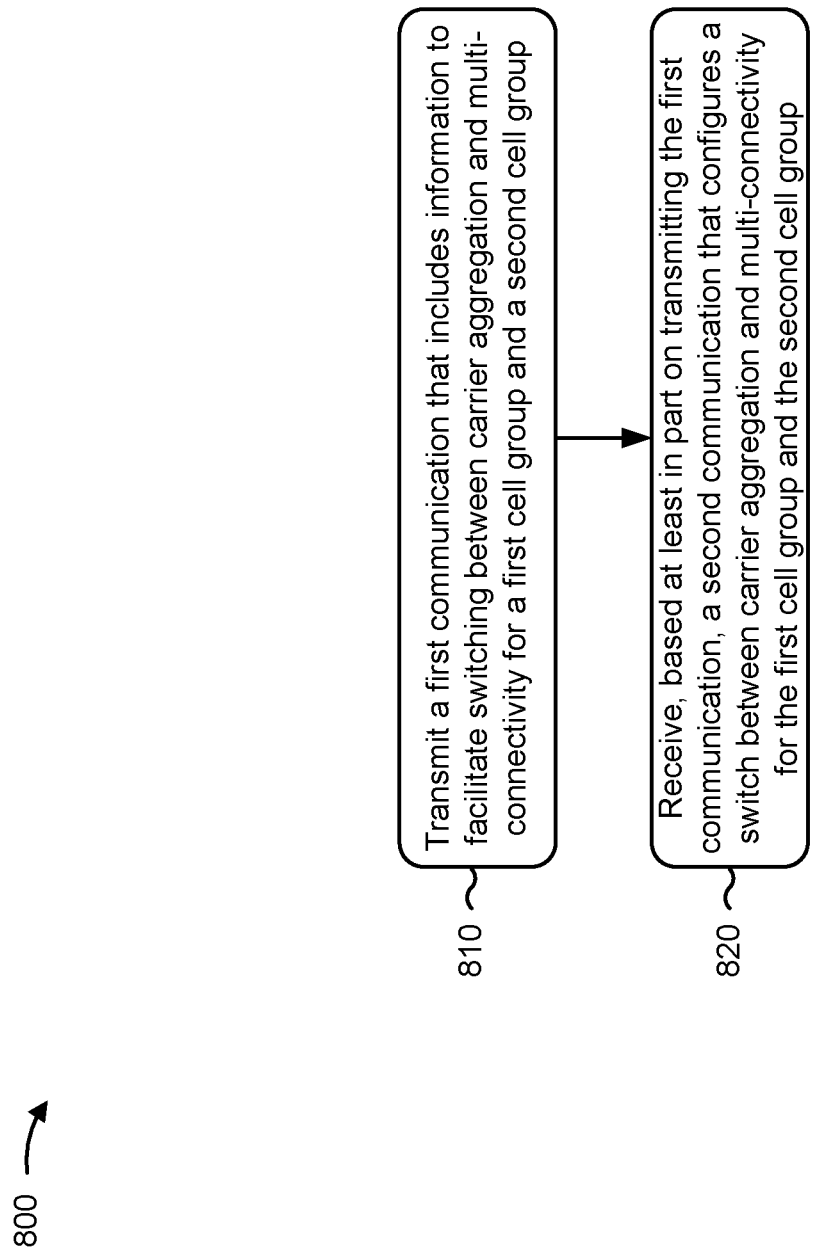

FIG. 8 is a diagram illustrating an example process 800 performed, for example, by a UE, in accordance with the present disclosure. Example process 800 is an example where the UE (e.g., UE 120 and/or the like) performs operations associated with dynamic switching between carrier aggregation and multi-connectivity.

As shown in FIG. 8, in some aspects, process 800 may include transmitting a first communication that includes information to facilitate switching between carrier aggregation and multi-connectivity for a first cell group and a second cell group (block 810). For example, the UE (e.g., using receive processor 258, transmit processor 264, controller/processor 280, memory 282, and/or the like) may transmit a first communication that includes information to facilitate switching between carrier aggregation and multi-connectivity for a first cell group and a second cell group, as described above.

As further shown in FIG. 8, in some aspects, process 800 may include receiving, based at least in part on transmitting the first communication, a second communication that configures a switch between carrier aggregation and multi-connectivity for the first cell group and the second cell group (block 820). For example, the UE (e.g., using receive processor 258, transmit processor 264, controller/processor 280, memory 282, and/or the like) may receive, based at least in part on transmitting the first communication, a second communication that configures a switch between carrier aggregation and multi-connectivity for the first cell group and the second cell group, as described above.

Process 800 may include additional aspects, such as any single aspect or any combination of aspects described below and/or in connection with one or more other processes described elsewhere herein.

In a first aspect, the information to facilitate switching between carrier aggregation and multi-connectivity for the first cell group and the second cell group comprises: an indication of a preference for carrier aggregation, or an indication of a preference for multi-connectivity. In a second aspect, alone or in combination with the first aspect, the information to facilitate switching between carrier aggregation and multi-connectivity for the first cell group and the second cell group includes a PHR report, a transport latency between the first cell group and the second cell group, a bandwidth between the first cell group and the second cell group, a frequency band associated with the first cell group, a frequency band associated with the second cell group, an uplink/downlink link imbalance associated with the first cell group, an uplink/downlink link imbalance associated with the second cell group, a TDD band or a FDD band associated with the first cell group, a TDD band or an FDD band associated with the second cell group, a TDD pattern associated with the first cell group, a TDD pattern associated with the second cell group, a HARQ feedback mode associated with the first cell group, a HARQ feedback mode associated with the second cell group, a quantity of CCs in the first cell group, a quantity of CCs in the second cell group, an indication of which CCs are in the first cell group, an indication of which CCs are in the second cell group, a MAC-CE communication, a CSI report, or one or more signal measurements.

In a third aspect, alone or in combination with one or more of the first and second aspects, the information to facilitate selection of carrier aggregation or multi-connectivity for the first cell group and the second cell group is based at least in part on at least one of a UE transmit power associated with the UE, a UE power consumption in carrier aggregation associated with the UE, a UE power consumption in multi-connectivity associated with the UE, a difference in aggregated bandwidth between the first cell group and the second cell group, a difference in subcarrier spacing between the first cell group and the second cell group, a frequency band associated with the first cell group, a frequency band associated with the second cell group, an uplink/downlink link imbalance associated with the first cell group, an uplink/downlink link imbalance associated with the second cell group, a TDD band or a FDD band associated with the first cell group, a TDD band or an FDD band associated with the second cell group, a TDD pattern associated with the first cell group, a TDD pattern associated with the second cell group, a HARQ feedback mode associated with the first cell group, a HARQ feedback mode associated with the second cell group, a quantity of CCs in the first cell group, a quantity of CCs in the second cell group, an indication of which CCs are in the first cell group, an indication of which CCs are in the second cell group, or a QoS parameter associated with application traffic.

In a fourth aspect, alone or in combination with one or more of the first through third aspects, transmitting the first communication includes transmitting the first communication during an ongoing call. In a fifth aspect, alone or in combination with one or more of the first through fourth aspects, the first communication includes a measurement report, a CSI report, or a MAC-CE communication.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
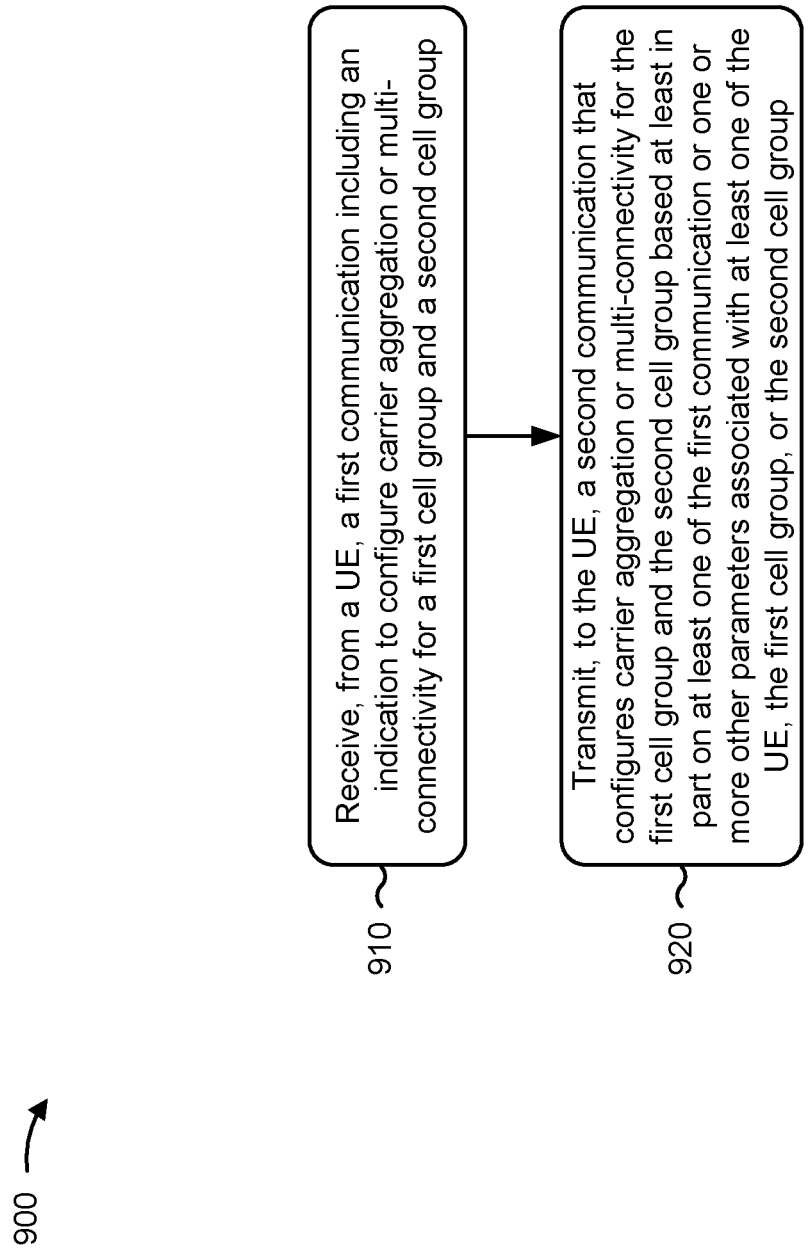

FIG. 9 is a diagram illustrating an example process 900 performed, for example, by a BS, in accordance with the present disclosure. Example process 900 is an example where the BS (e.g., BS 110 and/or the like) performs operations associated with dynamic switching between carrier aggregation and multi-connectivity.

As shown in FIG. 9, in some aspects, process 900 may include receiving, from a UE, a first communication including an indication to configure carrier aggregation or multi-connectivity for a first cell group and a second cell group (block 910). For example, the BS (e.g., using transmit processor 220, receive processor 238, controller/processor 240, memory 242, and/or the like) may receive, from a UE, a first communication including an indication to configure carrier aggregation or multi-connectivity for a first cell group and a second cell group, as described above.

As further shown in FIG. 9, in some aspects, process 900 may include transmitting, to the UE, a second communication that configures carrier aggregation or multi-connectivity for the first cell group and the second cell group based at least in part on at least one of: the first communication, or one or more other parameters associated with at least one of the UE, the first cell group, or the second cell group (block 920). For example, the BS (e.g., using transmit processor 220, receive processor 238, controller/processor 240, memory 242, and/or the like) may transmit, to the UE, a second communication that configures carrier aggregation or multi-connectivity for the first cell group and the second cell group based at least in part on at least one of, as described above.

Process 900 may include additional aspects, such as any single aspect or any combination of aspects described below and/or in connection with one or more other processes described elsewhere herein.

In a first aspect, receiving the first communication includes receiving the first communication during at least one of a call setup, an RRC resume procedure, or a handover of the UE. In a second aspect, alone or in combination with the first aspect, the first communication includes an RRC setup request communication, an RRC resume request communication, or a measurement report.

In a third aspect, alone or in combination with one or more of the first and second aspects, the one or more other parameters comprise at least one of a PHR provided by the UE, a traffic buffer size associated with the first cell group, a traffic buffer size associated with the second cell group, an SRS SINR associated with the UE, inter-site carrier aggregation associated with the first cell group and the second cell group, whether the first cell group and the second cell group are co-located, a transport latency between the first cell group and the second cell group, a bandwidth between the first cell group and the second cell group, a bandwidth associated with the first cell group, a bandwidth associated with the second cell group, a TDD pattern associated with the first cell group, a TDD pattern associated with the second cell group, a HARQ feedback mode associated with the first cell group, a HARQ feedback mode associated with the second cell group, a quantity of CCs in the first cell group, a quantity of CCs in the second cell group, an indication of which CCs are in the first cell group, an indication of which CCs are in the second cell group, or radio access network splitting associated with the first cell group and the second cell group.

In a fourth aspect, alone or in combination with one or more of the first through third aspects, the information to facilitate selection of carrier aggregation or multi-connectivity includes information to facilitate switching between carrier aggregation and multi-connectivity for the first cell group and the second cell group, and the second communication configures a switch between carrier aggregation and multi-connectivity for the first cell group and the second cell group. In a fifth implementation, alone or in combination with one or more of the first through fourth implementations, the second communication configures carrier aggregation with at least one of one or more TAGs or one or more PUCCH groups. In a sixth implementation, alone or in combination with one or more of the first through fifth implementations, process 900 includes transmitting, based at least in part on receiving the second communication, a third communication indicating that configuration of carrier aggregation or multi-connectivity configuration has been implemented by the UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
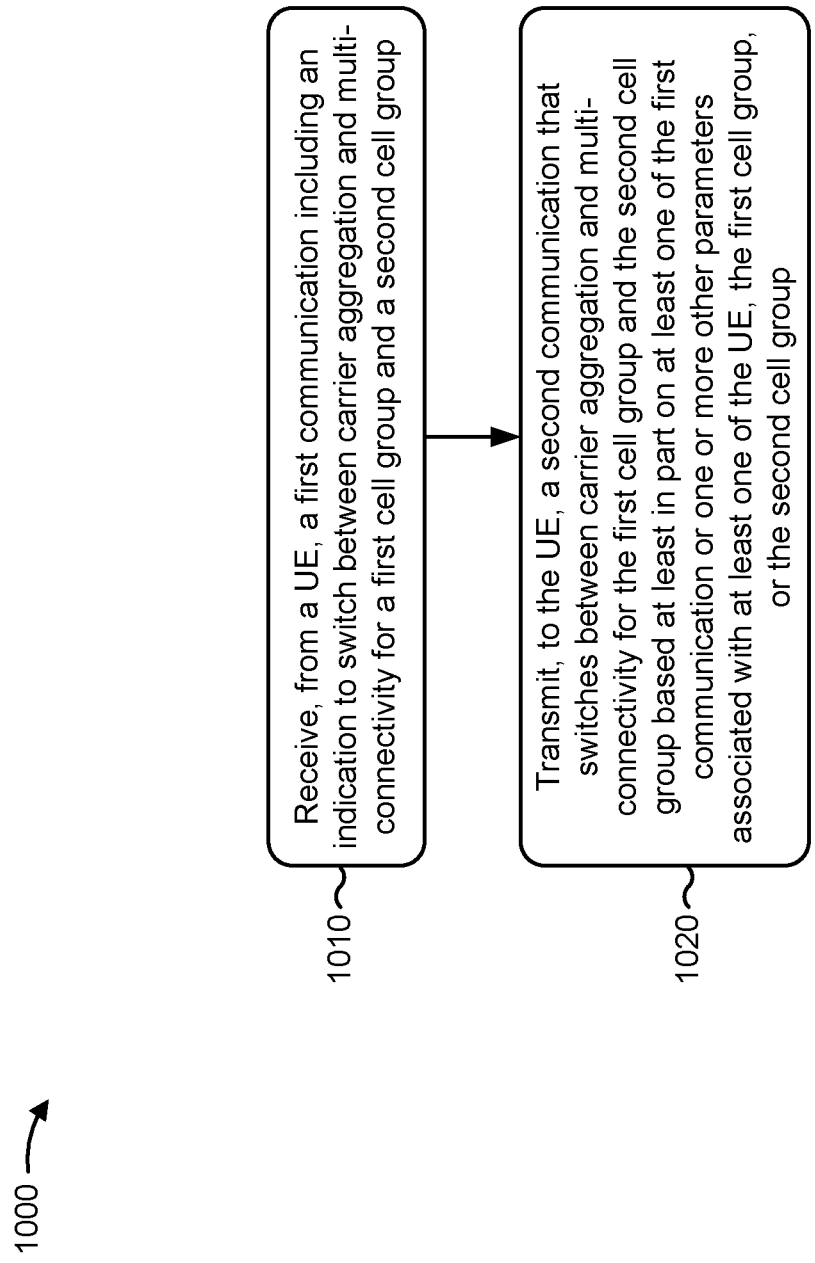

FIG. 10 is a diagram illustrating an example process 1000 performed, for example, by a BS, in accordance with the present disclosure. Example process 1000 is an example where the BS (e.g., BS 110 and/or the like) performs operations associated with dynamic switching between carrier aggregation and multi-connectivity.

As shown in FIG. 10, in some aspects, process 1000 may include receiving, from a UE, a first communication including an indication to switch between carrier aggregation and multi-connectivity for a first cell group and a second cell group (block 1010). For example, the BS (e.g., using transmit processor 220, receive processor 238, controller/processor 240, memory 242, and/or the like) may receive, from a UE, a first communication including an indication to switch between carrier aggregation and multi-connectivity for a first cell group and a second cell group, as described above.

As further shown in FIG. 10, in some aspects, process 1000 may include transmitting, to the UE, a second communication that switches between carrier aggregation and multi-connectivity for the first cell group and the second cell group based at least in part on at least one of: the first communication, or one or more other parameters associated with at least one of the UE, the first cell group, or the second cell group (block 1020). For example, the BS (e.g., using transmit processor 220, receive processor 238, controller/processor 240, memory 242, and/or the like) may transmit, to the UE, a second communication that switches between carrier aggregation and multi-connectivity for the first cell group and the second cell group based at least in part on at least one of, as described above.

Process 1000 may include additional aspects, such as any single aspect or any combination of aspects described below and/or in connection with one or more other processes described elsewhere herein.

In a first aspect, receiving the first communication includes receiving the first communication during an ongoing call associated with the UE. In a second aspect, alone or in combination with the first aspect, the first communication includes a measurement report, a MAC-CE communication, or a CSI report.

In a third aspect, alone or in combination with one or more of the first and second aspects, the one or more other parameters comprise at least one of a PHR provided by the UE, a traffic buffer size associated with application traffic, an SRS SINR associated with the UE, inter-site carrier aggregation associated with the first cell group and the second cell group, a frequency band associated with the first cell group, a frequency band associated with the second cell group, an uplink/downlink link imbalance associated with the first cell group, an uplink/downlink link imbalance associated with the second cell group, a TDD band or a FDD band associated with the first cell group, a TDD band or an FDD band associated with the second cell group, a TDD pattern associated with the first cell group, a TDD pattern associated with the second cell group, a HARQ feedback mode associated with the first cell group, a HARQ feedback mode associated with the second cell group, a quantity of CCs in the first cell group, a quantity of CCs in the second cell group, an indication of which CCs are in the first cell group, an indication of which CCs are in the second cell group, whether the first cell group and the second cell group are co-located, a transport latency between the first cell group and the second cell group, a bandwidth between the first cell group and the second cell group, a bandwidth associated with the first cell group, a bandwidth associated with the second cell group, or radio access network splitting associated with the first cell group and the second cell group.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The following provides an overview of some Aspects of the present disclosure:

Aspect 1: A method of wireless communication performed by a user equipment (UE), comprising: transmitting a first communication that includes information to facilitate selection of carrier aggregation or multi-connectivity for a first cell group and a second cell group; and receiving, based at least in part on transmitting the first communication, a second communication that configures carrier aggregation or multi-connectivity for the first cell group and the second cell group.

Aspect 2: The method of Aspect 1, wherein the information to facilitate selection of carrier aggregation or multi-connectivity for the first cell group and the second cell group comprises: an indication of a preference for carrier aggregation, or an indication of a preference for multi-connectivity. Aspect 3: The method of Aspect 1 or 2, wherein the information to facilitate selection of carrier aggregation or multi-connectivity for the first cell group and the second cell group comprises: a power headroom report (PHR), a transport latency between the first cell group and the second cell group, an aggregated bandwidth between the first cell group and the second cell group, a frequency band associated with the first cell group, a frequency band associated with the second cell group, an uplink/downlink link imbalance associated with the first cell group, or an uplink/downlink link imbalance associated with the second cell group. Aspect 4: The method of any of Aspects 1-3, wherein the information to facilitate selection of carrier aggregation or multi-connectivity for the first cell group and the second cell group comprises: a time division duplexing (TDD) band or a frequency division duplexing (FDD) band associated with the first cell group, a TDD band or an FDD band associated with the second cell group, a TDD pattern associated with the first cell group, a TDD pattern associated with the second cell group, a hybrid automatic repeat request (HARQ) feedback mode associated with the first cell group, or a HARQ feedback mode associated with the second cell group.

Aspect 5: The method of any of Aspects 1-4, wherein the information to facilitate selection of carrier aggregation or multi-connectivity for the first cell group and the second cell group comprises: a quantity of component carriers (CCs) in the first cell group, a quantity of CCs in the second cell group, an indication of which CCs are in the first cell group, an indication of which CCs are in the second cell group, a medium access control control element (MAC-CE) communication, a channel state information (CSI) report, or one or more signal measurements. Aspect 6: The method of any of Aspects 1-5, wherein the information to facilitate selection of carrier aggregation or multi-connectivity for the first cell group and the second cell group is based at least in part on at least one of: a UE transmit power associated with the UE, a UE power consumption in carrier aggregation associated with the UE, a UE power consumption in multi-connectivity associated with the UE, a difference in aggregated bandwidth between the first cell group and the second cell group, or a difference in subcarrier spacing between the first cell group and the second cell group.

Aspect 7: The method of any of Aspects 1-6, wherein the information to facilitate selection of carrier aggregation or multi-connectivity for the first cell group and the second cell group is based at least in part on at least one of: a frequency band associated with the first cell group, a frequency band associated with the second cell group, an uplink/downlink link imbalance associated with the first cell group, or an uplink/downlink link imbalance associated with the second cell group. Aspect 8: The method of any of Aspects 1-7, wherein the information to facilitate selection of carrier aggregation or multi-connectivity for the first cell group and the second cell group is based at least in part on at least one of: a time division duplexing (TDD) band or a frequency division duplexing (FDD) band associated with the first cell group, a TDD band or an FDD band associated with the second cell group a TDD pattern associated with the first cell group, a TDD pattern associated with the second cell group, a hybrid automatic repeat request (HARQ) feedback mode associated with the first cell group, or a HARQ feedback mode associated with the second cell group.

Aspect 9: The method of any of Aspects 1-8, wherein the information to facilitate selection of carrier aggregation or multi-connectivity for the first cell group and the second cell group is based at least in part on at least one of: a quantity of component carriers (CCs) in the first cell group, a quantity of CCs in the second cell group, an indication of which CCs are in the first cell group, an indication of which CCs are in the second cell group, or a quality of service (QoS) parameter associated with application traffic. Aspect 10: The method of any of Aspects 1-9, wherein transmitting the first communication comprises: transmitting the first communication during at least one of: a call setup, a radio resource control (RRC) resume procedure, or a handover of the UE.

Aspect 11: The method of any of Aspects 1-10, wherein the first communication comprises: a radio resource control (RRC) setup request communication, an RRC resume request communication, a measurement report, a medium access control control element (MAC-CE) communication, or a channel state information (CSI) report. Aspect 12: The method of any of Aspects 1-11, wherein the information to facilitate selection of carrier aggregation or multi-connectivity comprises: information to facilitate switching between carrier aggregation and multi-connectivity for the first cell group and the second cell group; and wherein the second communication configures a switch between carrier aggregation and multi-connectivity for the first cell group and the second cell group.

Aspect 13: The method of Aspect 12, wherein the information to facilitate switching between carrier aggregation and multi-connectivity for the first cell group and the second cell group comprises: an indication of a preference for carrier aggregation, or an indication of a preference for multi-connectivity. Aspect 14: The method of any of Aspects 1-13, wherein the second communication configures carrier aggregation with at least one of: one or more timing advance groups (TAGs), or one or more physical uplink control channel (PUCCH) groups. Aspect 15: The method of any of Aspects 1-14, further comprising: transmitting, based at least in part on receiving the second communication, a third communication indicating that configuration of carrier aggregation or multi-connectivity configuration has been implemented by the UE.

Aspect 16: A method of wireless communication performed by a base station (BS), comprising: receiving, from a user equipment (UE), a first communication including an indication to configure carrier aggregation or multi-connectivity for a first cell group and a second cell group; and transmitting, to the UE, a second communication that configures carrier aggregation or multi-connectivity for the first cell group and the second cell group based at least in part on at the first communication.

Aspect 17: The method of Aspect 16, wherein receiving the first communication comprises: receiving the first communication during at least one of: a call setup, a radio resource control (RRC) resume procedure, or a handover of the UE. Aspect 18: The method of Aspect 16 or 17, wherein the first communication comprises: a radio resource control (RRC) setup request communication, an RRC resume request communication, a measurement report, a beam switching communication, or a beam failure recovery communication. Aspect 19: The method of any of Aspects 16-18, wherein the one or more other parameters comprise at least one of: a power headroom report (PHR) provided by the UE, a traffic buffer size associated with the first cell group, a traffic buffer size associated with the second cell group, a sounding reference signal (SRS) signal to interference plus noise ratio (SINK) associated with the UE, inter-site carrier aggregation associated with the first cell group and the second cell group.

Aspect 20: The method of any of Aspects 16-19, wherein the one or more other parameters comprise at least one of: whether the first cell group and the second cell group are co-located, a transport latency between the first cell group and the second cell group, a bandwidth between the first cell group and the second cell group, a bandwidth associated with the first cell group, a bandwidth associated with the second cell group, or radio access network splitting associated with the first cell group and the second cell group. Aspect 21: The method of any of Aspects 16-20, wherein the one or more other parameters comprise at least one of: a time division duplexing (TDD) pattern associated with the first cell group, a TDD pattern associated with the second cell group, a hybrid automatic repeat request (HARQ) feedback mode associated with the first cell group, or a HARQ feedback mode associated with the second cell group.

Aspect 22: The method of any of Aspects 16-21, wherein the one or more other parameters comprise at least one of: a quantity of component carriers (CCs) in the first cell group, a quantity of CCs in the second cell group, an indication of which CCs are in the first cell group, or an indication of which CCs are in the second cell group. Aspect 23: The method of any of Aspects 16-22, wherein the indication to configure carrier aggregation or multi-connectivity for the first cell group and the second cell group comprises: an indication to switch between carrier aggregation and multi-connectivity for the first cell group and the second cell group; and wherein the second communication switches between carrier aggregation and multi-connectivity for the first cell group and the second cell group based at least in part on the first communication.

Aspect 24: The method of Aspect 23, wherein receiving the first communication comprises: receiving the first communication during an ongoing call associated with the UE. Aspect 25: The method of Aspect 23 or 24, wherein the first communication comprises: a measurement report, a medium access control control element (MAC-CE) communication, or a channel state information (CSI) report.

Aspect 26: The method of any of Aspects 16-25, wherein transmitting the second communication comprises: transmitting the second communication based at least in part on one or more other parameters associated with at least one of the UE, the first cell group, or the second cell group. Aspect 27: The method of any of Aspects 16-26, further comprising: receiving, based at least in part on transmitting the second communication, a third communication indicating that configuration of carrier aggregation or multi-connectivity configuration has been implemented by the UE.

Aspect 28: An apparatus for wireless communication at a device, comprising a processor; memory coupled with the processor; and instructions stored in the memory and executable by the processor to cause the apparatus to perform the method of one or more Aspects of Aspects 1-15. Aspect 29: A device for wireless communication, comprising a memory and one or more processors coupled to the memory, the memory and the one or more processors configured to perform the method of one or more Aspects of Aspects 1-15. Aspect 30: An apparatus for wireless communication, comprising at least one means for performing the method of one or more Aspects of Aspects 1-15.

Aspect 31: A non-transitory computer-readable medium storing code for wireless communication, the code comprising instructions executable by a processor to perform the method of one or more Aspects of Aspects 1-15. Aspect 32: A non-transitory computer-readable medium storing a set of instructions for wireless communication, the set of instructions comprising one or more instructions that, when executed by one or more processors of a device, cause the device to perform the method of one or more Aspects of Aspects 1-15.

Aspect 33: An apparatus for wireless communication at a device, comprising a processor; memory coupled with the processor; and instructions stored in the memory and executable by the processor to cause the apparatus to perform the method of one or more Aspects of Aspects 16-27. Aspect 34: A device for wireless communication, comprising a memory and one or more processors coupled to the memory, the memory and the one or more processors configured to perform the method of one or more Aspects of Aspects 16-27. Aspect 35: An apparatus for wireless communication, comprising at least one means for performing the method of one or more Aspects of Aspects 16-27.

Aspect 36: A non-transitory computer-readable medium storing code for wireless communication, the code comprising instructions executable by a processor to perform the method of one or more Aspects of Aspects 16-27. Aspect 37: A non-transitory computer-readable medium storing a set of instructions for wireless communication, the set of instructions comprising one or more instructions that, when executed by one or more processors of a device, cause the device to perform the method of one or more Aspects of Aspects 16-27.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   transmitting a first communication that includes information to switch between carrier aggregation and multi-connectivity for a first cell group and a second cell group; and
   receiving, based at least in part on transmitting the first communication, a second communication that configures a switch between carrier aggregation and multi-connectivity for the first cell group and the second cell group.

2. The method of claim 1, wherein the information to switch between carrier aggregation and multi-connectivity for the first cell group and the second cell group comprises:
   an indication of a preference for carrier aggregation, or
   an indication of a preference for multi-connectivity.

3. The method of claim 1, wherein the information to switch between carrier aggregation and multi-connectivity for the first cell group and the second cell group comprises:
   a power headroom report (PHR),
   a transport latency between the first cell group and the second cell group,
   an aggregated bandwidth between the first cell group and the second cell group,
   a frequency band associated with the first cell group,
   a frequency band associated with the second cell group,
   an uplink/downlink link imbalance associated with the first cell group, or
   an uplink/downlink link imbalance associated with the second cell group.

4. The method of claim 1, wherein the information to switch between carrier aggregation and multi-connectivity for the first cell group and the second cell group comprises:
   a time division duplexing (TDD) band or a frequency division duplexing (FDD) band associated with the first cell group,
   a TDD band or an FDD band associated with the second cell group,
   a TDD pattern associated with the first cell group,
   a TDD pattern associated with the second cell group,
   a hybrid automatic repeat request (HARQ) feedback mode associated with the first cell group, or
   a HARQ feedback mode associated with the second cell group.

5. The method of claim 1, wherein the information to switch between carrier aggregation and multi-connectivity for the first cell group and the second cell group comprises:
   a quantity of component carriers (CCs) in the first cell group,
   a quantity of CCs in the second cell group,
   an indication of which CCs are in the first cell group,
   an indication of which CCs are in the second cell group,
   a medium access control control element (MAC-CE) communication,
   a channel state information (CSI) report, or
   one or more signal measurements.

6. The method of claim 1, wherein the information to switch between carrier aggregation and multi-connectivity for the first cell group and the second cell group is based at least in part on at least one of:
   a UE transmit power associated with the UE,
   a UE power consumption in carrier aggregation associated with the UE,
   a UE power consumption in multi-connectivity associated with the UE,
   a difference in aggregated bandwidth between the first cell group and the second cell group, or
   a difference in subcarrier spacing between the first cell group and the second cell group.

7. The method of claim 1, wherein the information to switch between carrier aggregation and multi-connectivity for the first cell group and the second cell group is based at least in part on at least one of:
   a frequency band associated with the first cell group,
   a frequency band associated with the second cell group,
   an uplink/downlink link imbalance associated with the first cell group, or
   an uplink/downlink link imbalance associated with the second cell group.

8. The method of claim 1, wherein the information to switch between carrier aggregation and multi-connectivity for the first cell group and the second cell group is based at least in part on at least one of:
   a time division duplexing (TDD) band or a frequency division duplexing (FDD) band associated with the first cell group,
   a TDD band or an FDD band associated with the second cell group
   a TDD pattern associated with the first cell group,
   a TDD pattern associated with the second cell group,
   a hybrid automatic repeat request (HARQ) feedback mode associated with the first cell group, or a HARQ feedback mode associated with the second cell group.

9. The method of claim 1, wherein the information to switch between carrier aggregation and multi-connectivity for the first cell group and the second cell group is based at least in part on at least one of:
a quantity of component carriers (CCs) in the first cell group,
a quantity of CCs in the second cell group,
an indication of which CCs are in the first cell group,
an indication of which CCs are in the second cell group, or
a quality of service (QOS) parameter associated with application traffic.

10. The method of claim 1, wherein transmitting the first communication comprises:
transmitting the first communication during at least one of:
a call setup,
a radio resource control (RRC) resume procedure, or
a handover of the UE.

11. The method of claim 1, wherein the first communication comprises:
a radio resource control (RRC) setup request communication,
an RRC resume request communication,
a measurement report,
a medium access control control element (MAC-CE) communication, or
a channel state information (CSI) report.

12. The method of claim 1, wherein the second communication configures carrier aggregation with at least one of:
one or more timing advance groups (TAGs), or
one or more physical uplink control channel (PUCCH) groups.

13. The method of claim 1, further comprising: transmitting, based at least in part on receiving the second communication, a third communication indicating that configuration of carrier aggregation or multi-connectivity configuration has been implemented by the UE.

14. A method of wireless communication performed by network entity, comprising:
receiving, from a user equipment (UE), a first communication including an indication to switch between carrier aggregation and multi-connectivity for a first cell group and a second cell group; and
transmitting, to the UE, a second communication that configures a switch between carrier aggregation and multi-connectivity for the first cell group and the second cell group based at least in part on at the first communication.

15. The method of claim 14, wherein receiving the first communication comprises:
receiving the first communication during at least one of:
a call setup,
a radio resource control (RRC) resume procedure, or
a handover of the UE.

16. The method of claim 14, wherein the first communication comprises:
a radio resource control (RRC) setup request communication,
an RRC resume request communication,
a measurement report,
a beam switching communication, or
a beam failure recovery communication.

17. The method of claim 14, wherein transmitting the second communication comprises:
transmitting the second communication based at least in part on one or more other parameters associated with at least one of the UE, the first cell group, or the second cell group.

18. The method of claim 17, wherein the one or more other parameters comprise at least one of:
a power headroom report (PHR) provided by the UE,
a traffic buffer size associated with the first cell group,
a traffic buffer size associated with the second cell group,
a sounding reference signal (SRS) signal to interference plus noise ratio (SINR) associated with the UE, or
inter-site carrier aggregation associated with the first cell group and the second cell group.

19. The method of claim 14, wherein the indication to switch between carrier aggregation and multi-connectivity for the first cell group and the second cell group comprises:
a power headroom report (PHR),
a transport latency between the first cell group and the second cell group,
an aggregated bandwidth between the first cell group and the second cell group,
a frequency band associated with the first cell group,
a frequency band associated with the second cell group,
an uplink/downlink link imbalance associated with the first cell group, or
an uplink/downlink link imbalance associated with the second cell group.

20. The method of claim 14, wherein the indication to switch between carrier aggregation and multi-connectivity for the first cell group and the second cell group comprises:
a time division duplexing (TDD) band or a frequency division duplexing (FDD) band associated with the first cell group,
a TDD band or an FDD band associated with the second cell group,
a TDD pattern associated with the first cell group,
a TDD pattern associated with the second cell group,
a hybrid automatic repeat request (HARQ) feedback mode associated with the first cell group, or
a HARQ feedback mode associated with the second cell group.

21. A user equipment (UE) for wireless communication, comprising:
a memory; and
one or more processors, coupled to the memory, configured to:
transmit a first communication that includes information to switch between carrier aggregation and multi-connectivity for a first cell group and a second cell group; and
receive, based at least in part on transmitting the first communication, a second communication that configures a switch between carrier aggregation and multi-connectivity for the first cell group and the second cell group.

22. The UE of claim 21, wherein the information to switch between carrier aggregation and multi-connectivity for the first cell group and the second cell group comprises:
an indication of a preference for carrier aggregation, or
an indication of a preference for multi-connectivity.

23. The UE of claim 21, wherein the information to switch between carrier aggregation and multi-connectivity for the first cell group and the second cell group comprises:
a power headroom report (PHR),
a transport latency between the first cell group and the second cell group, an aggregated bandwidth between the first cell group and the second cell group,
a frequency band associated with the first cell group,
a frequency band associated with the second cell group,
an uplink/downlink link imbalance associated with the first cell group, or
an uplink/downlink link imbalance associated with the second cell group.

24. The UE of claim 21, wherein the information to switch between carrier aggregation and multi-connectivity for the first cell group and the second cell group comprises:
a time division duplexing (TDD) band or a frequency division duplexing (FDD) band associated with the first cell group,
a TDD band or an FDD band associated with the second cell group,
a TDD pattern associated with the first cell group,
a TDD pattern associated with the second cell group,
a hybrid automatic repeat request (HARQ) feedback mode associated with the first cell group, or
a HARQ feedback mode associated with the second cell group.

25. The UE of claim 21, wherein the information to switch between carrier aggregation and multi-connectivity for the first cell group and the second cell group comprises:
a quantity of component carriers (CCs) in the first cell group,
a quantity of CCs in the second cell group,
an indication of which CCs are in the first cell group,
an indication of which CCs are in the second cell group,
a medium access control control element (MAC-CE) communication,
a channel state information (CSI) report, or
one or more signal measurements.

26. The UE of claim 21, wherein the information to switch between carrier aggregation and multi-connectivity for the first cell group and the second cell group is based at least in part on at least one of:
a UE transmit power associated with the UE,
a UE power consumption in carrier aggregation associated with the UE,
a UE power consumption in multi-connectivity associated with the UE,
a difference in aggregated bandwidth between the first cell group and the second cell group, or
a difference in subcarrier spacing between the first cell group and the second cell group.

27. The UE of claim 21, wherein the information to switch between carrier aggregation and multi-connectivity for the first cell group and the second cell group is based at least in part on at least one of:
a frequency band associated with the first cell group,
a frequency band associated with the second cell group,
an uplink/downlink link imbalance associated with the first cell group, or
an uplink/downlink link imbalance associated with the second cell group.

28. The UE of claim 21, wherein the information to switch between carrier aggregation and multi-connectivity for the first cell group and the second cell group is based at least in part on at least one of:
a time division duplexing (TDD) band or a frequency division duplexing (FDD) band associated with the first cell group,
a TDD band or an FDD band associated with the second cell group
a TDD pattern associated with the first cell group,
a TDD pattern associated with the second cell group,
a hybrid automatic repeat request (HARQ) feedback mode associated with the first cell group, or
a HARQ feedback mode associated with the second cell group.

29. The UE of claim 21, wherein the information to switch between carrier aggregation and multi-connectivity for the first cell group and the second cell group is based at least in part on at least one of:
a quantity of component carriers (CCs) in the first cell group,
a quantity of CCs in the second cell group,
an indication of which CCs are in the first cell group,
an indication of which CCs are in the second cell group, or
a quality of service (QOS) parameter associated with application traffic.

30. The UE of claim 21, wherein the one or more processors, to transmit the first communication, are configured to:
transmit the first communication during at least one of:
a call setup,
a radio resource control (RRC) resume procedure, or
a handover of the UE.

31. The UE of claim 21, wherein the first communication comprises:
a radio resource control (RRC) setup request communication,
an RRC resume request communication,
a measurement report,
a medium access control control element (MAC-CE) communication, or
a channel state information (CSI) report.

32. The UE of claim 21, wherein the second communication configures carrier aggregation with at least one of:
one or more timing advance groups (TAGs), or
one or more physical uplink control channel (PUCCH) groups.

33. The UE of claim 21, wherein the one or more processors are further configured to:
transmit, based at least in part on receiving the second communication, a third communication indicating that configuration of carrier aggregation or multi-connectivity configuration has been implemented by the UE.

34. A network entity for wireless communication, comprising:
a memory; and
one or more processors, coupled to the memory, configured to:
receive, from a user equipment (UE), a first communication including an indication to switch between carrier aggregation and multi-connectivity for a first cell group and a second cell group; and
transmit, to the UE, a second communication that configures a switch between carrier aggregation and multi-connectivity for the first cell group and the second cell group based at least in part on at the first communication.

35. The network entity of claim 34, wherein the one or more processors, to receive the first communication, are configured to:
receive the first communication during at least one of:
a call setup,
a radio resource control (RRC) resume procedure, or
a handover of the UE.

36. The network entity of claim 34, wherein the first communication comprises:

a radio resource control (RRC) setup request communication,
an RRC resume request communication,
a measurement report,
a beam switching communication, or
a beam failure recovery communication.

37. The network entity of claim 34, wherein the one or more processors, to transmit the second communication, are configured to:
    transmit the second communication based at least in part on one or more other parameters associated with at least one of the UE, the first cell group, or the second cell group.

38. The network entity of claim 37, wherein the one or more other parameters comprise at least one of:
    a power headroom report (PHR) provided by the UE,
    a traffic buffer size associated with the first cell group,
    a traffic buffer size associated with the second cell group,
    a sounding reference signal (SRS) signal to interference plus noise ratio (SINR) associated with the UE, or
    inter-site carrier aggregation associated with the first cell group and the second cell group.

39. The network entity of claim 34, wherein the indication to switch between carrier aggregation and multi-connectivity for the first cell group and the second cell group comprises:
    a power headroom report (PHR),
    a transport latency between the first cell group and the second cell group,
    an aggregated bandwidth between the first cell group and the second cell group,
    a frequency band associated with the first cell group,
    a frequency band associated with the second cell group,
    an uplink/downlink link imbalance associated with the first cell group, or
    an uplink/downlink link imbalance associated with the second cell group.

* * * * *